(12) United States Patent
Okamura et al.

(10) Patent No.: US 7,450,513 B2
(45) Date of Patent: Nov. 11, 2008

(54) NETWORK CONTROLLING APPARATUS AND PATH CONTROLLING METHOD THEREIN

(75) Inventors: Akiko Okamura, Kawasaki (JP); Hitoshi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 927 days.

(21) Appl. No.: 10/851,708

(22) Filed: May 20, 2004

(65) Prior Publication Data
US 2005/0169313 A1 Aug. 4, 2005

(30) Foreign Application Priority Data
Jan. 30, 2004 (JP) ............................. 2004-022781

(51) Int. Cl.
G01R 31/08 (2006.01)
H04J 1/16 (2006.01)
(52) U.S. Cl. .................. 370/235; 370/229; 370/230; 370/231; 370/237; 709/220; 709/227; 709/228; 709/229; 709/250
(58) Field of Classification Search .............. None
See application file for complete search history.

(56) References Cited

U.S. PATENT DOCUMENTS

| 5,745,694 | A | 4/1998 | Egawa et al. | |
|---|---|---|---|---|
| 6,970,919 | B1 * | 11/2005 | Doi et al. | 709/220 |
| 2001/0024438 | A1 | 9/2001 | Sugiyama et al. | |
| 2002/0141444 | A1 | 10/2002 | Kano et al. | |
| 2005/0185633 | A1 * | 8/2005 | Shigei | 370/352 |

FOREIGN PATENT DOCUMENTS

| CN | 1319983 | 10/2001 |
|---|---|---|
| JP | 6-30021 | 2/1994 |
| JP | 8-125654 | 5/1996 |
| JP | 2002-252636 | 9/2002 |
| JP | 2002-300194 | 10/2002 |
| JP | 2003-309832 | 10/2003 |

OTHER PUBLICATIONS

Chinese Office Action dated Oct. 27, 2006.

* cited by examiner

*Primary Examiner*—Chi H Pham
*Assistant Examiner*—Raj K Jain
(74) *Attorney, Agent, or Firm*—Katten Muchin Rosenman LLP

(57) ABSTRACT

A network controlling apparatus appropriately arranges a generated path every hour with a change in section and bandwidth requested in each time period to flexibly generate a path according to the state of occurrence of requests. The network apparatus comprises a storing unit storing information for management of the network, and a controlling unit controlling setting of the network device relating to a connection of network devices at two edge points in the network to obtain path setting satisfying the quality guarantee request, using a path already set or scheduled to be set, or a newly generated path, by referring to the information stored in the storing unit when receiving the quality guarantee request.

15 Claims, 17 Drawing Sheets

| | ACCOMMODATING PATH | BANDWIDTH | START TIME | END TIME |
|---|---|---|---|---|
| REQUEST #1 | PATH #1 | 5Mbps | TIME SLOT 3 | TIME SLOT 4 |
| REQUEST #2 | PATH #2 | 1Mbps | TIME SLOT 4 | TIME SLOT 7 |
| REQUEST #3 | PATH #3 | 2Mbps | TIME SLOT 1 | TIME SLOT 4 |
| ... | ... | | ... | ... |

FIG. 7

| | | | | 110 ↙ | | |
|---|---|---|---|---|---|---|
| ROUTER 1 | LINK 216 | OWN IP ADDRESS | FORWARDING IP ADDRESS | WL | WLMAX | WLAvail |
| | LINK 220 | OWN IP ADDRESS | FORWARDING IP ADDRESS | WL | WLMAX | WLAvail |
| | ... | ... | ... | ... | ... | ... |
| | LINK 211 | OWN IP ADDRESS | FORWARDING IP ADDRESS | WL | WLMAX | WLAvail |
| ... | ... | ... | ... | ... | ... | ... |
| ROUTER 206 | LINK 212 | OWN IP ADDRESS | FORWARDING IP ADDRESS | WL | WLMAX | WLAvail |
| | ... | ... | ... | ... | ... | ... |
| | LINK 215 | OWN IP ADDRESS | FORWARDING IP ADDRESS | WL | WLMAX | WLAvail |

FIG. 14(a)

| TIME SLOT | FROM 10 O'CLOCK | FROM 11 O'CLOCK | FROM 12 O'CLOCK | FROM 13 O'CLOCK | FROM 14 O'CLOCK | FROM 15 O'CLOCK |
|---|---|---|---|---|---|---|
| LINK 217 | 30(40),1 | 45(25),2 | 15(55),1 | 15(55),1 | 0(70),0 | 0(70),0 |
| LINK 218 | 0(70),0 | 15(55),2 | 15(55),1 | 15(55),1 | 0(70),0 | 0(70),0 |
| PATH P1 | 30 | 30 | | | | |
| PATH P2 | | 15 | 15 | 15 | | |

{ 60: LINK BANDWIDTH MANAGEMENT DB (LINK 217, LINK 218) }
{ 50: PATH MANAGEMENT DB (SECURED BANDWIDTH) (PATH P1, PATH P2) }

FIG. 14(b)

| TIME SLOT | FROM 10 O'CLOCK | FROM 11 O'CLOCK | FROM 12 O'CLOCK | FROM 13 O'CLOCK | FROM 14 O'CLOCK | FROM 15 O'CLOCK |
|---|---|---|---|---|---|---|
| LINK 217 | 30(40),1 | 65(5),2 | 15(55),1 | 20(50),1 | 5(65),1 | 0(70),0 |
| LINK 218 | 0(70),0 | 35(35),2 | 15(55),1 | 20(50),1 | 5(65),1 | 0(70),0 |
| PATH P1 | 30 | 30 | | | | |
| PATH P2 | | 35 | 15 | 20 | 5 | |

FIG. 16(a)

| TIME SLOT | FROM 10 O'CLOCK | FROM 11 O'CLOCK | FROM 12 O'CLOCK | FROM 13 O'CLOCK | FROM 14 O'CLOCK | FROM 15 O'CLOCK |
|---|---|---|---|---|---|---|
| LINK 217 | 30(40),1 | 45(25),2 | 15(55),1 | 15(55),1 | 0(70),0 | 0(70),0 |
| LINK 218 | 0(70),0 | 15(55),2 | 15(55),1 | 15(55),1 | 0(70),0 | 0(70),0 |
| PATH P1 | 30 | 30 | | | | |
| PATH P2 | | 15 | 15 | 15 | | |

FIG. 16(b)

| TIME SLOT | FROM 10 O'CLOCK | FROM 11 O'CLOCK | FROM 12 O'CLOCK | FROM 13 O'CLOCK | FROM 14 O'CLOCK | FROM 15 O'CLOCK |
|---|---|---|---|---|---|---|
| LINK 217 | 30(40),1 | 45(25),2 | 15(55),1 | 15(55),1 | 0(70),0 | 0(70),0 |
| LINK 218 | 0(70),0 | 15(55),2 | 0(70),0 | 0(70),0 | 0(70),0 | 0(70),0 |
| LINK 212 | 0(70),0 | 20(50),1 | 0(70),0 | 0(70),0 | 0(70),0 | 0(70),0 |
| LINK 214 | 0(70),0 | 20(50),1 | 0(70),0 | 0(70),0 | 0(70),0 | 0(70),0 |
| PATH P1 | 30 | 30 | | | | |
| PATH P2 | | 15 | 15 | 15 | | |
| PATH P3 | | 20 | | | | |

FIG. 18(a)

| TIME SLOT | FROM 10 O'CLOCK | FROM 11 O'CLOCK | FROM 12 O'CLOCK | FROM 13 O'CLOCK | FROM 14 O'CLOCK | FROM 15 O'CLOCK |
|---|---|---|---|---|---|---|
| LINK 217 | 30(40),1 | 45(25),2 | 15(55),1 | 15(55),1 | 0(70),1 | 0(70),1 |
| LINK 218 | 0(70),1 | 15(55),2 | 15(55),1 | 15(55),1 | 0(70),1 | 0(70),1 |
| LINK 212 | 0(70),1 | 20(50),1 | 0(70),1 | 20(50),1 | 20(50),1 | 0(70),1 |
| LINK 214 | 0(70),1 | 20(50),1 | 0(70),1 | 20(50),1 | 20(50),1 | 0(70),1 |
| PATH P1 | 30 | 30 | | | | |
| PATH P2 | | 15 | 15 | 15 | | |
| PATH P3 | | 20 | | | | |
| PATH P4 | | | | 20 | 20 | |

MERGED INTO ONE PATH

FIG. 18(b)

| LINK 212 | 0(70),1 | 20(50),1 | 0(70),1 | 20(50),1 | 20(50),1 | 0(70),1 |
|---|---|---|---|---|---|---|
| LINK 214 | 0(70),1 | 20(50),1 | 0(70),1 | 20(50),1 | 20(50),1 | 0(70),1 |
| PATH P4 | | 20 | 0 | 20 | 20 | |

NETWORK CONTROLLING APPARATUS AND PATH CONTROLLING METHOD THEREIN

BACKGROUND OF THE INVENTION

1) Field of the Invention

The present invention relates to an apparatus providing a communication service guaranteeing a communication quality in an arbitrary time zone by a reservation in a network, preferably in a label switching network. Particularly, the present invention relates to a network controlling apparatus and a path controlling method in the network controlling apparatus suited to be used when a communication service guaranteeing a communication quality in an arbitrary time zone by a reservation is provided in a network employing MPLS (Multiprotocol Label Switching).

2) Description of the Related Art

In recent years, research is carried out to provide a bandwidth guaranteed service guaranteeing a communication quality in an arbitrary time zone by a reservation. The bandwidth guaranteed service is a service in which when a user requests a network to provide a communication guaranteeing a bandwidth, the network secures the bandwidth by a reservation. Whereby, the user can get a guarantee of the communication quality in the secured bandwidth and accept the communication service. Particularly, when an MPLS network provider provides this bandwidth guaranteed service, there is a demand for efficient use of the network resource.

In the MPLS network, a route connecting two edges nodes, which are boundary nodes with external networks, is set as a path identified as an LSP (Label Switched Path), label information differing from header information in a packet such as an IP packet is attached to a packet, the packet is transferred with the label through the path, whereby the packet can be transferred at high speed. Use of the path enables the packet to be transferred through an explicit route. Meanwhile, in relation with the label switching in the MPLS network, there is a technique described in patent document 1 below, for example.

In order to practically secure a bandwidth in the MPLS network and make a communication along a secured route, it is necessary that not the user but the network (network provider) manages the state of use of links configuring the network, sets a path on a route along which the necessary bandwidth can be secured, and accommodates a flow to be guaranteed in the path. For the purpose of guaranteeing the communication quality and using efficiently the network resource at the same time in such the MPLS network, it is necessary to manage the communication quality in each set path in the whole MPLS network.

As an apparatus making a known bandwidth reservation, there is a system of making a bandwidth reservation in, for example, an ATM (Asynchronous Transfer Mode) exchange (refer to patent document 2). In this system, only a bandwidth of a link connected to the ATM exchange is reserved in response to a request, thus a reservation along a route in the whole network is impossible. Namely, this system cannot manage the communication quality of each path being as a unit.

Patent document 3 below shows a technique, wherein a television conference reservation is accepted by a conference reservation server, a communication route satisfying the network resource reservation request for the television conference is determined on the IP (Internet Protocol) network to make a resource reservation, whereby the television conference reservation is accepted.

As a technique aimed to accept a reservation and secure a bandwidth in response to each request, there is a technique with regard to a line reservation apparatus and a reservation accepting apparatus described in patent document 4. In the technique described in patent document 4, it is determined whether or not a reservation can be accepted on the basis of the state of occurrence of reservations, the state of use of the network resource and the possibility of acceptance of the reservation in relation with time in the network.

The techniques described in the patent documents 3 and 4 do not assume a network in which a path for communication is set between two network apparatuses in the network. The techniques thus do not give consideration to what route the path is set along according to contents of the reservation, whether or not a plurality of reservations are accommodated in the same path, and whether or not different paths are set for the plural reservations, for the purpose of efficient use of the network resources.

As methods of securing a bandwidth responsive to a quality guarantee request in the MPLS network: (1) a first method is of beforehand setting paths among all edge nodes at which quality guarantee can be requested, accommodating a request in the set path when the request is accepted, and managing the remaining bandwidths of the links; (2) a second method is of making a route calculation each time a request occurs, and setting a path in which the bandwidth is secured; and (3) a third method is of making a route calculation to set a path when a request occurs, securing a bandwidth greater than the requested bandwidth, and generating an intensive path which can accommodate requests that may occur thereafter in the same section.

Patent Document 1: Japanese Patent Laid Open (Kokai) Publication No. 2002-300194

Patent Document 2: Japanese Patent Laid Open (Kokai) Publication No. HEI 6-30021

Patent Document 3: Japanese Patent Laid Open (Kokai) Publication No. 2003-309832

Patent Document 4: Japanese Patent Laid Open (Kokai) Publication No. HEI 8-125654

In a network providing a service of accepting a reservation of the bandwidth guaranteed service and guaranteeing a bandwidth in an arbitrary time period, there is desired a method of efficiently assigning the network resource according to the state of occurrence of the requests since the requested bandwidths, sections, length of time, and the amount of occurring requests are changed with time, thereby satisfying the requests, when the bandwidth is secured in response to a quality guarantee request in the above MPLS network.

With respect to this point, the first method [1] above described poses a problem that it uses only a predetermined path, thus cannot change the route even when the state of use of the links changes with time, which leads to a trouble when effective use of the network resource is aimed. The method also fails improvement of the loss probability.

The second method [2] can appropriately assign the network resource (for example, bandwidth) because the route calculation and setting are performed for each request, but lacks the scalability because the processing overhead increases.

The third method [3] can decrease the processing overhead because a bandwidth greater than the requested bandwidth is secured, but wastefully secures the resource because bandwidths not to be used is also secured.

SUMMARY OF THE INVENTION

In the light of the above problems, an object of the present invention is to provide a network controlling apparatus and a path controlling apparatus therein, which appropriately arrange a generated path every hour with a change in section and bandwidth requested in each time period, thereby flexibly generating a path according to the state of occurrence of requests.

Therefore, the present invention provides, a network controlling apparatus used in a network configured by connecting a plurality of network devices to one another, the network controlling apparatus for controlling setting of a path for carrying out communication between two network devices in the network comprising a storing unit for storing information for managing the network, and a controlling unit for controlling setting of the network devices relating to a connection at two edge points in the network to obtain path setting meeting a quality guarantee request of a reservation type for the connection, using a path already set or scheduled to be set, or a newly generated path, by referring to the information stored in the storing unit when receiving the quality guarantee request.

Preferably, the storing unit comprises a path management storing unit for storing management information on the path already set or scheduled to be set, a link information storing unit for storing information about connections among the network devices configuring the network as link information, and the controlling unit comprises an existing path accommodation capability determining unit for determining whether or not the connection of the quality guarantee request can be accommodated in the path already set or scheduled to be set on the basis of contents of the quality guarantee request and contents stored in the path management storing unit and the link information storing unit.

The storing unit may further comprise a request contents storing unit for storing contents of an accepted quality guarantee request, and the controlling unit may further comprise an updating unit for updating the contents stored in the path management storing unit according to the contents of the quality guarantee request when the existing path accommodation capability determining unit determines that the connection of the quality guarantee request can be accommodated in the path already set or scheduled to be set, and a request registering unit for entering the contents of the quality guarantee request as accepted contents in the request contents storing unit.

In the controlling unit, when the existing path accommodation capability determining unit determines that the connection of the quality guarantee request can be accommodated in the path already set or scheduled to be set, by changing attribute of a start time and an end time in setting of the path already set or scheduled to be set, the updating unit may update the attribute of the start time and the end time of setting of the path already set or scheduled to be set.

The storing unit may further comprise a network device management information storing unit for storing management information on each of the network devices configuring the network, and the controlling unit may further comprise a new route retrieving unit for newly retrieving a route for the connection on the basis of contents stored in the link information storing unit and the network device management information storing unit when the existing path accommodation capability determining unit determines that the connection of the quality guarantee request cannot be accommodated in the path already set or scheduled to be set.

In this case, the existing path accommodation capability determining unit may determine whether or not the route retrieved by the new route retrieving unit can be accommodated in the path already set or scheduled to be set, so that the existing path accommodation capability determining unit determines whether or not the connection of the quality guarantee request can be accommodated in the path already set or scheduled to be set along the retrieved route.

When the existing path accommodation capability determining unit determines as a result of the aid determination on the retrieved route that the connection of the quality guarantee request cannot be accommodated in the path already set or scheduled to be set along the retrieved route, the request registering unit may enter a request for newly generating a path along the retrieved route in the request contents storing unit.

When the existing path accommodation capability determining unit determines as a result of the determination on the retrieved route that the connection of the quality guarantee request can be accommodated in the path already set or scheduled to be set along the retrieved route, it is possible that a path is not newly generated along the route retrieved by the new route retrieving unit, but contents stored in the path management storing unit are updated according to the contents of the quality guarantee request by the updating unit, and the request registering unit enters the contents of the quality guarantee request in the request contents storing unit.

The controlling unit may comprise a device setting controlling unit for controlling setting of network devices relating to the connection while referring to contents stored in the storing unit.

The controlling unit may receive the quality guarantee request containing identification information on a quality guarantee requested section between two edge points in the network, information on a quality guarantee requested bandwidth, and start/end time information from a start time to an end time of the quality guarantee, when the path management storing unit manages a path which is set in the same section as the section between the two edge points in the network requested the quality guarantee, is set in a time period containing a time zone from the start time to the end time in the quality guarantee request, and has a remaining bandwidth sufficient to satisfy the quality guarantee request, the existing path accommodation capability determining unit may determine that the connection of the quality guarantee request can be accommodated in the path.

In this case, preferably, when the path management storing unit manages a path which is set in the same section as the quality guarantee requested section between the two edge points in the network, is set in a time period partly containing the time zone from the start time to the end time in the quality guarantee request, and has a remaining bandwidth sufficient to satisfy the quality guarantee request, the existing path accommodation capability determining unit determines that the connection of the aid quality guarantee request can be accommodated in the path as well, and the updating unit updates attribute of a start time to an end time of setting of the path so that a time period from the start time to the end time of the path contains the time zone from the start to the end time in the quality guarantee request.

The controlling unit may receive the quality guarantee request containing identification information on a quality guarantee requested section between two edge points in the network, information on a quality guarantee requested bandwidth, and start/end time information from a start time to an end time of the quality guarantee, the existing path accommodation capability determining unit may determine that the connection of the quality guarantee request can be accommodated in a path when the path is set in the same section as the quality guarantee requested section between the two edge points in the network, is set in a time period containing all or a part of a time zone from the start time to the end time in the quality guarantee request, and has a remaining bandwidth sufficient to satisfy the quality guarantee request, and a bandwidth of the path does not exceeds a bandwidth assigned for quality guarantee to be used for the path in the time zone from the start time to the end time in the quality guarantee request if the connection of the quality guarantee request is accommodated in the path.

The network controlling apparatus may further comprise a request accepting unit for receiving the quality guarantee request, and passing the received quality guarantee request to the controlling unit, wherein the request accepting unit collects a plurality of quality guarantee requests, and passes the quality guarantee requests to the controlling unit.

The link information storing unit may store information on a remaining bandwidth assignable for quality guarantee in each time zone of each connection between the network devices as the link information, and the new route retrieving unit mayperform the route retrieval using a connection in which the remaining bandwidth assignable for quality guarantee always satisfies the quality guarantee request in a time zone from a start time to an end time of a quality guarantee requested in the quality guarantee request.

The link information storing unit may store information on a remaining bandwidth assignable for quality guarantee in each time zone of each connection between the network devices as the link information, and the new route retrieving unit may calculate a cost on the basis of the information on a remaining bandwidth assignable for quality guarantee in a time zone from a start time to an end time requested in the quality guarantee request, and retrieve an optimum route on the basis of a result of the calculation.

In this case, when the new route retrieving unit retrieves a plurality of routes as candidates, the retrieving unit may calculate a route evaluation value of each of the plurality of routes with a value of the number of paths using in each connection between network devices configuring the route, which varies within a time zone containing the start time to the end time in the quality guarantee request, and a bandwidth assignable to the connection between the network devices, and the new route retrieving unit may determine one optimum route as a result of the retrieval on the basis of the route evaluation values.

The present invention further provides a path controlling method in a network controlling apparatus for controlling a network configured by connecting a plurality of network devices to one another, the path controlling method for controlling setting of a path for connecting two network devices in said network, comprising the steps of a storing step of storing information for managing the network, a quality guarantee request receiving step of receiving a quality guarantee request of a reservation type for a connection between network devices at two edge points in the network, and a controlling step of controlling setting of the network devices relating to the connection to set a path satisfying the quality guarantee request using a path already set or scheduled to be set, or a newly generated by, by referring to the stored information for managing the network.

According to this invention, the controlling unit appropriately arranges a generated path every hour with a change in section and bandwidth requested in each time period while referring to contents of the storing unit, thereby flexibly generating a path according to the state of occurrence of requests.

Therefore, it is possible to improve efficiency of the path setting process and optimize the use rate of the network resource. When it is desired to assign the resource along the optimum route in response to a quality guarantee request of a reservation type, a path already assigned for a quality guarantee request is used when it is determined appropriate to use the path, whereby the overhead of the path setting process can be reduced. When it is determined that use of the path is not appropriate, a new path is retrieved. As this, a path is rearranged (reset) according to the new situation when the situation changes to optimize the resource use efficiency.

In addition, by means of the existing path accommodation capability determining unit, the updating unit and the request registering unit, it is possible to accommodate a newly received quality guarantee request in a path already set or scheduled to be set which can satisfy contents of the quality guarantee request, so that the overhead of the path setting process can be reduced.

BRIEF DESCRIPTION OF THE DRAWINGS

FIG. 7 is a diagram showing network information for route calculation;

FIGS. 14(a) and 14(b) are diagrams for illustrating an updating mode of the storing unit according to the embodiment of this invention;

FIGS. 16(a) and 16(b) are diagrams for illustrating an updating mode of the storing unit according to the embodiment of this invention;

FIGS. 18(a) and 18(b) are diagrams for illustrating an updating mode of the storing unit according to the embodiment of this invention.

DESCRIPTION OF THE PREFERRED EMBODIMENTS

Hereinafter, description will be made of an embodiment of the present invention with reference to the drawings.

Figure 2:
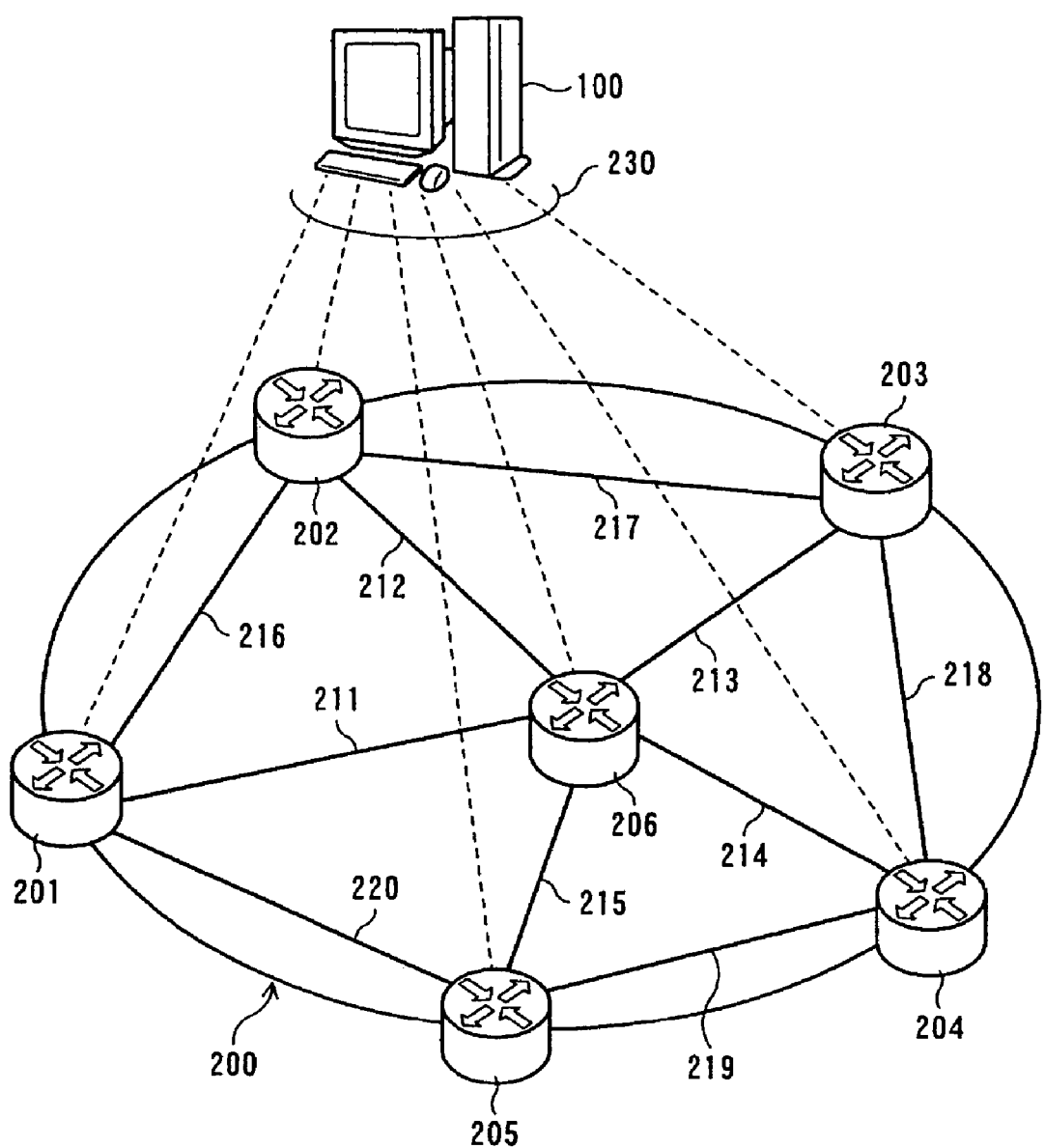
FIG. 2 is a diagram showing an MPLS network system to which the network controlling apparatus according to the embodiment is applied.

FIG. 2 is a diagram showing an MPLS network system to which a network controlling apparatus according to an embodiment of this invention is applied. The network controlling apparatus 100 controls setting of the MPLS network 200. The MPLS network 200 is configured by connecting routers 201 through 206, which are a plurality (six in FIG. 2) of network devices, to one another.

In the MPLS network 200, the routers 201 through 205 are edge routers directly connected to external networks, while the router 206 is a core router not connected to the external network.

The core router 206 is connected to each of the edge routers 201 through 205 through respective links 211 through 215, and adjacent edge routers 201 through 205 are connected to each other through links 216 through 220.

In a general IP network, a node determines a node to which an IP packet is next transferred each time the node receives a packet on the basis of an IP address in the header attached to the packet. In the MPLS network 200, a path (LSP) along a specific route is set between edge nodes, a label is attached to a packet to be transferred through the routers 201 to 206 on the path on the basis of an LSP number for identifying the path, whereby the packet can be transferred through the set path by switching based on the label.

Practically, an LSP is beforehand assigned to a combination of a source address and a destination address as being a unit, for example, and when packets are received from the outside, packets having the same combination are transferred through the same LSP by label switching.

The network controlling apparatus 100 is connected to each of the routers 201 through 206 configuring the above MPLS network 200 over control lines 230 to set and control communication setting, etc. in each of the routers 201 through 206, thereby performing setting control on the LSPs. Practically, the network controlling apparatus 100 manages usable bandwidths and remaining usable bandwidths of the LSPs in the MPLS network 200, and performs the setting control on the LSPs according to a quality guarantee request while aiming at efficient use of the network resource.

Figure 1:
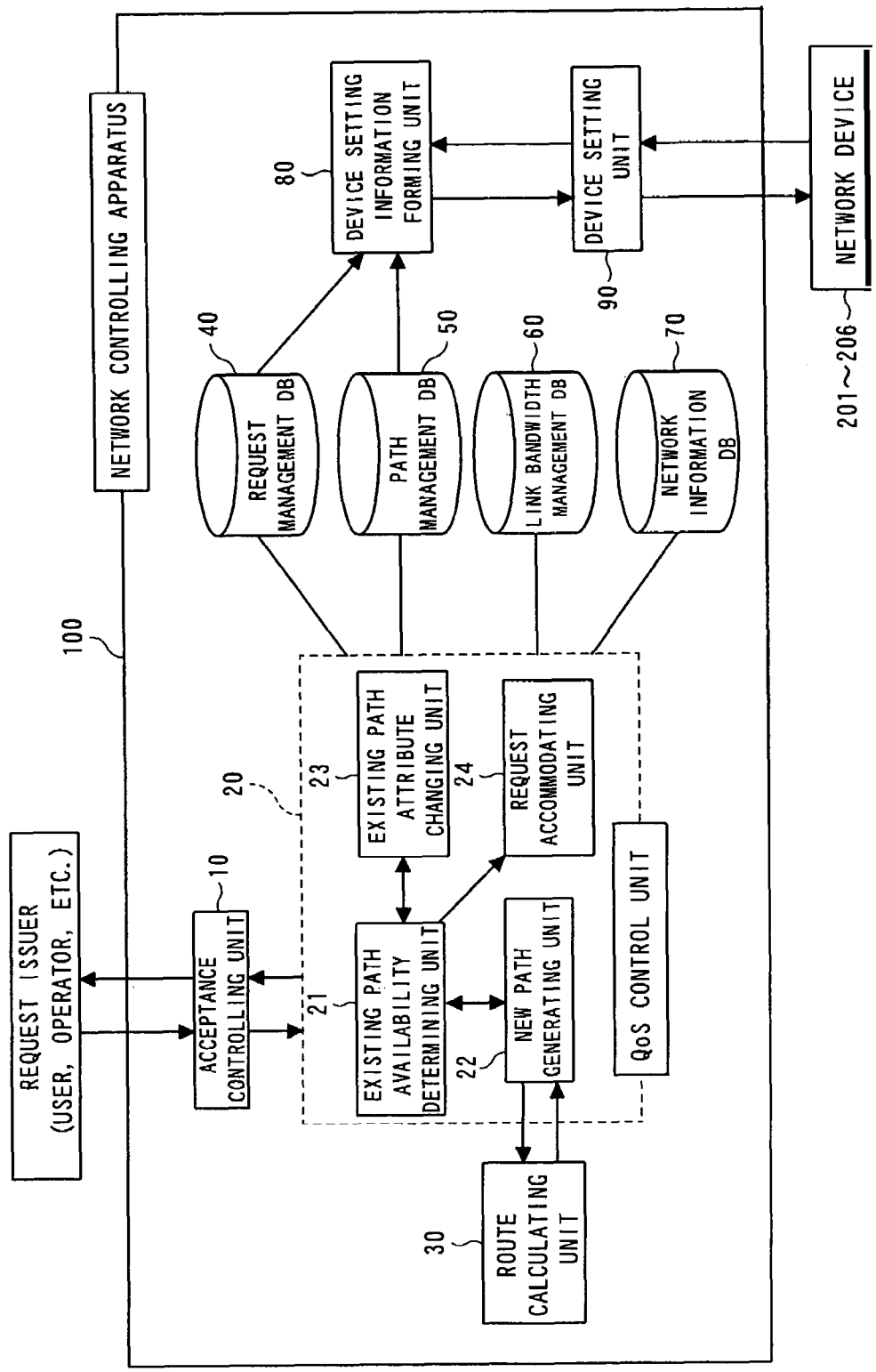
FIG. 1 is a block diagram showing a network controlling apparatus according to an embodiment of this invention.

FIG. 1 is a block diagram showing the network controlling apparatus 100 according to this embodiment. As shown in FIG. 1, the network controlling apparatus 100 comprises an acceptance control unit 10, a QOS control unit 20, a route calculating unit 30, a request management database (DB) 40, a path management database 50, a link bandwidth management database 60, a network information database 70, a device setting information forming unit 80 and a device setting unit 90.

The request management database (DB) 40, the path management database 50, the link bandwidth management database 60 and the network information database 70 together constitute a storing unit 1 storing information for management of the network 200. The QOS control unit 20, the route calculating unit 30, the device setting information forming unit 80 and the device setting unit 90 together constitute a control unit. When receiving a quality guarantee request of a reservation type for a connection between network devices (i.e., two of the five edge routers 201 through 205) at two edge points in the network 200, the control unit refers to contents stored in the storing unit 1, and controls setting of the network devices relating to (a) link(s) configuring a path, thereby setting the path coping with the quality guarantee request, using a path already set or a path scheduled to be set, or a newly generated path.

Figure 3:
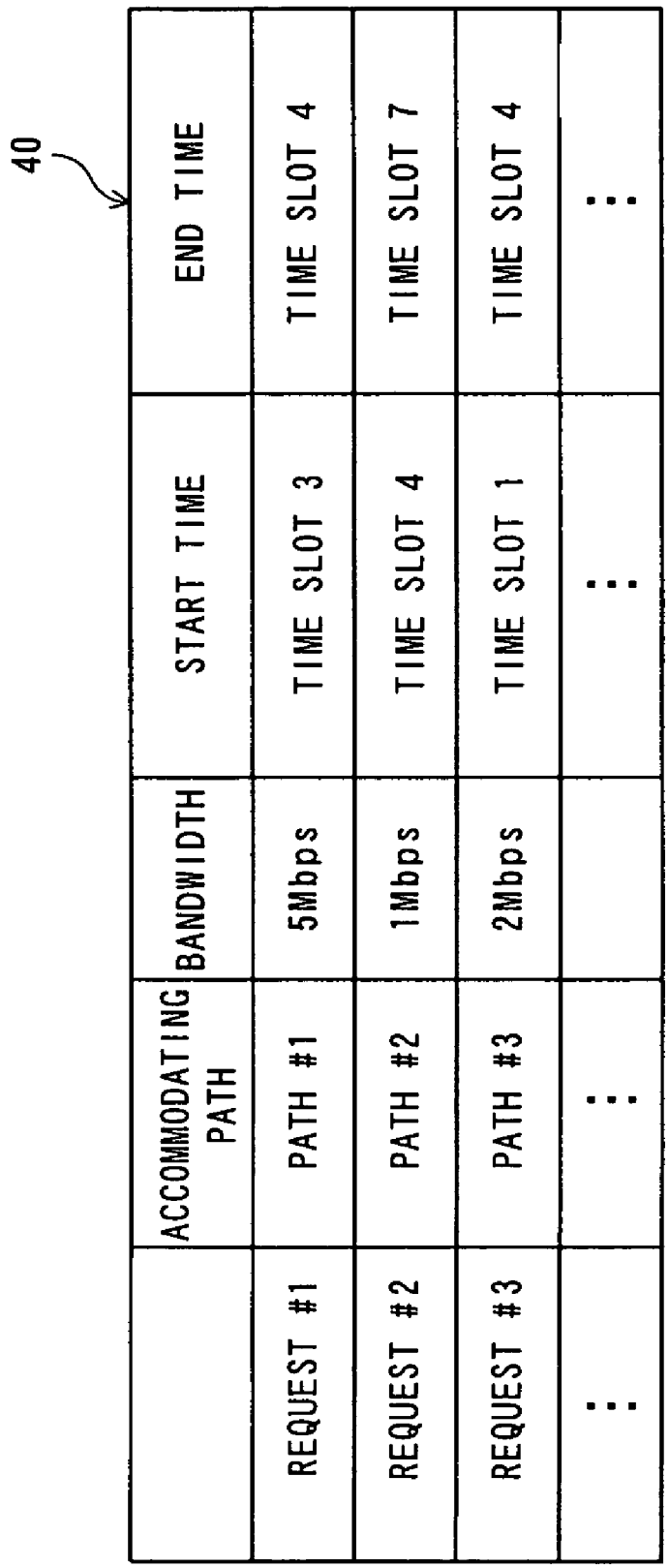
FIG. 3 is a diagram showing a structure of a request management database as being a request contents storing unit.

FIG. 3 is a diagram showing a structure of the request management database 40 as being a request contents storing unit. The request management database 40 stores contents of an accepted quality guarantee request. Practically, as shown in FIG. 3, the request management database 40 stores a path identification number (LSP number), a requested bandwidth, and time slot numbers indicating a start time and an end time of each of requests to be accommodated (#1, #2, #3, . . . ) as being accepted quality guarantee requests.

For example, the request management database 40 stores an LSP number of a path #1 to accommodate the request, 5 Mbps as being the requested bandwidth, and a time slot number "3" indicating the start time, a time slot number "4" indicating the end time, as contents of the quality guarantee request as being the request #1.

In the network controlling apparatus 100, the time slot is defined as a time unit for which a path is set. However, an arbitrary time period may be set as the unit. For example, 10 minutes may be one time slot, or one hour may be one time slot.

Figure 4:
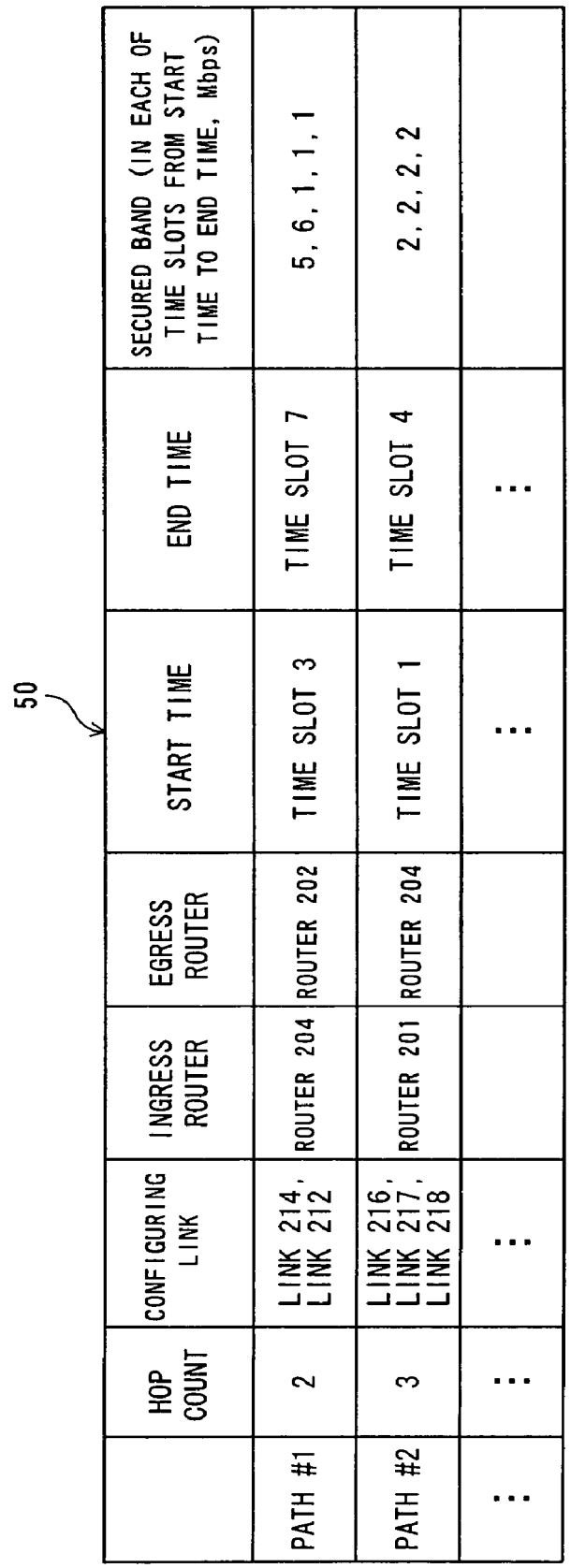
FIG. 4 is a diagram showing a structure of a path management database as being a path management storing unit.

FIG. 4 is a diagram showing a structure of the path management database 50 as being a path management storing unit. The path management database 50 stores management information about a path already set or scheduled to be set. Practically, as shown in FIG. 4, the path management database 50 stores information about a hop count, configuring links, an entrance router and an exit router of the path, a start time and an end time of the set path, and bandwidths to be secured in each of time slots of the path, for each of paths (#1, #2, . . . ) already set or scheduled to be set.

For example, as management information on path #1, the entrance router is the router 204, the exit router is the router 202, the hop count is two, i.e., the two links 214 and 212, the start time is time slot "3," the end time is time slot "7," the secured bandwidths in the time slots "3" through "7" are 5 Mbps, 6 Mbps, 1 Mbps, 1 Mbps and 1 Mbps, respectively, correspondingly to the contents of the request #1 (refer to FIG. 3). This management information is stored in the path management database 50.

Figure 5:
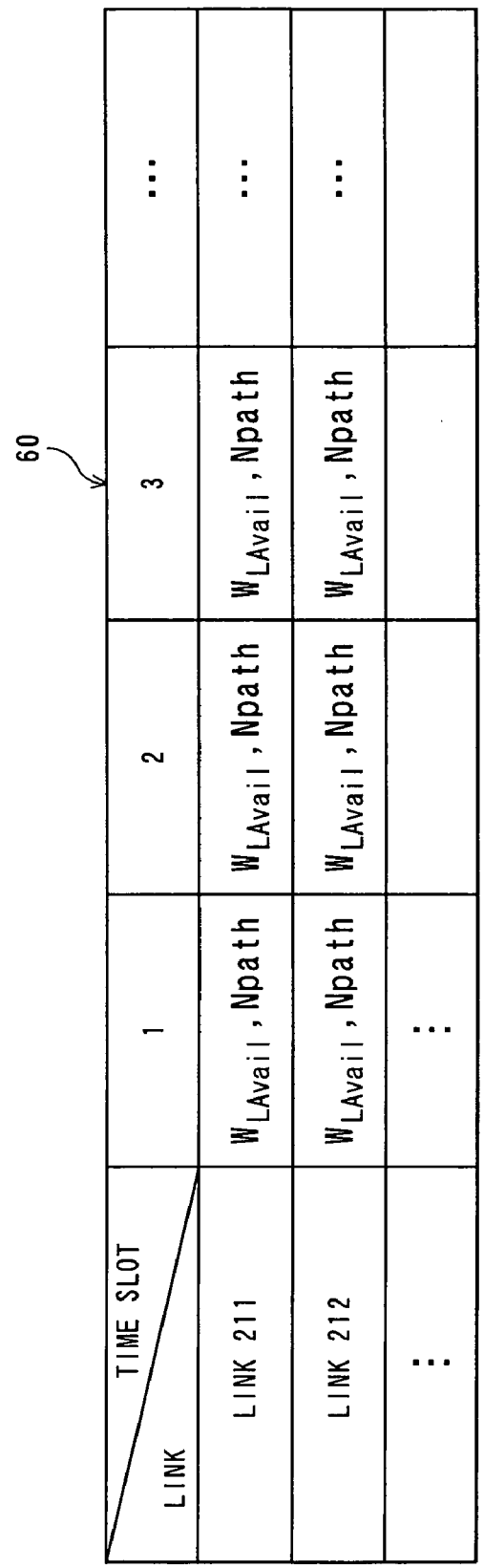
FIG. 5 is a diagram showing a structure of a link bandwidth management database as being a link information storing unit.

FIG. 5 is a diagram showing a structure of the link bandwidth management database 60 as being a link information storing unit. The link bandwidth information database 60 stores, as link information, information about connections among the routers 201 through 206 as being network devices configuring the MPLS network 200. Practically, as shown in FIG. 5, the link bandwidth management database 60 stores assignable remaining bandwidth (WLAvail) and the number of paths (Npath) in each of time slots ("1," "2," "3," . . . ) in each of the links (211 through 220).

Figure 6:
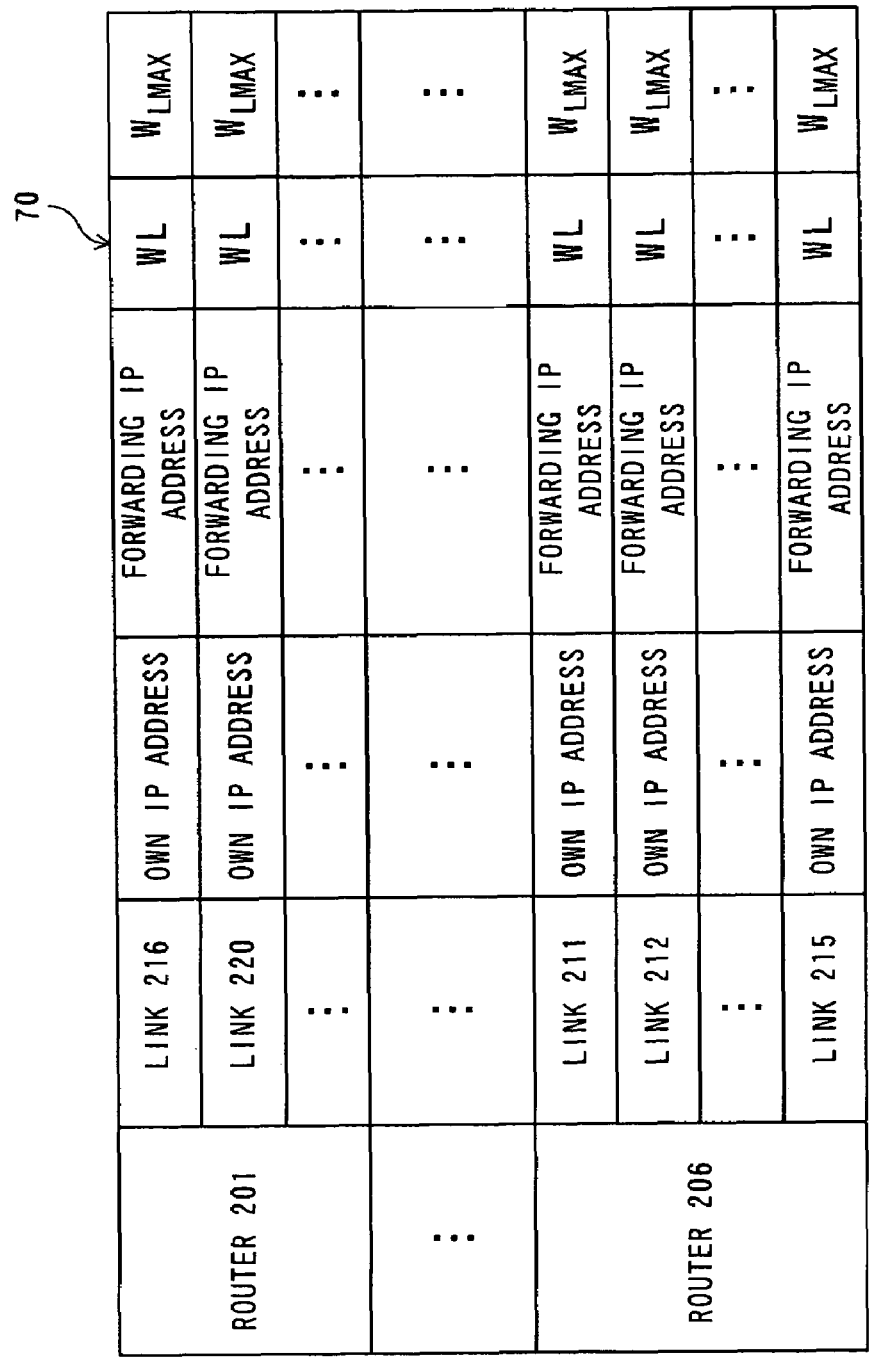
FIG. 6 is a diagram showing a structure of a network information database as being a network device management information storing unit.

FIG. 6 is a diagram showing a structure of the network information database 70 as being a network device management information storing unit. The network information database 70 stores management information on the routers 201 through 206 configuring the MPLS network 200. Practically, the network information database 70 stores an own IP address, a forwarding IP address, a physical bandwidth WL and usable bandwidth WLMAX of each link of each of the routers 201 through 206, as management information. Incidentally, the usable bandwidth WLMAX may be a fixed value that is determined according to the policy of the network 200, or may be varied.

The acceptance control unit 10 accepts a quality guaranteed service request from the network manager or a user who issues the request, and notifies the QOS control unit 20 of the accepted quality guaranteed service request. Each time the acceptance control unit 10 accepts a quality guaranteed service request, the acceptance control unit 10 notifies the QOS control unit 20 of the request. Alternatively, the acceptance control unit 10 may notify the QOS control unit 20 of a plurality of quality guaranteed service requests at a time.

The QOS control unit 20 forming the control unit receives a quality guarantee request notified from the acceptance control unit 10, uses an existing path (already set or scheduled to be set) stored in the above path management database 50 or a new path which copes with the request, and enters network devices, path setting, etc. coping with the request in the databases 40, 50, 60 and 70 (hereinafter simply referred to as 40 through 70, occasionally) as being the storing unit. The QOS control unit 20 comprises an existing path availability determining unit 21, a new path generating unit 22, an existing path attribute changing unit 23 and a request accommodating unit 24, to be described later.

The route calculating unit 30 calculates a route of the new path according to an instruction from the QOS control unit 20 to determine a resource to be assigned to the quality guaranteed service request.

When the quality guaranteed service request notified from the acceptance control unit 10, the existing path availability determining unit 21 of the QOS control unit 20 refers to the path management database 50 and the link bandwidth management database 60, and determines whether or not there is an appropriate path for execution of the quality guarantee request among existing paths set at present or scheduled to be set.

Namely, the existing path availability determining unit 21 functions as an existing path accommodation capability determining unit determining whether or not the connection of the above quality guarantee request can be accommodated in a path already set or scheduled to be set, on the basis of contents of the quality guaranteed service request and contents stored in the path management database 50 and the link bandwidth management database 60.

When a path in the requested section in the quality guaranteed service request is present in the requested time period and the assignable resource (bandwidth) is left sufficiently in links along the path, the existing path availability determining unit 21 determines that it is appropriate to execute the request with the path. Conversely, when no path is present in the requested time period in the quality guaranteed service request, and the assignable resource (bandwidth) is not sufficiently left in links along the path even if a path is present, the existing path availability determining unit 21 outputs a request to calculate a route of the new path.

When receiving the request to calculate a route of the new path from the existing path availability determining unit 21, the new path generating unit 22 refers to the link bandwidth management database 60 and the network information database 70, prepares network information for route calculation 110 as shown in FIG. 7, and requests the route calculating unit 30 to calculate a route of the new path. As the above network information for route calculation 110, it is possible to add an available remaining bandwidth WLAvail of each link connected to a relevant router to the management information stored in the network information database 70 to form the database, as shown in FIG. 7.

Accordingly, the new path generating unit 22 and the route calculating unit 30 together function as a new route retrieving unit for newly retrieving a route for a connection between edge routers coping with the quality guarantee request on the basis of contents stored in the link bandwidth management database 60 and the network information database 70 when the existing path availability determining unit 21 determines that the connection of the quality guarantee request cannot be accommodated in a path already set or scheduled to be set.

At this time, when a route that can be generated as the new path as a result of route calculation by the route calculation, the new path generating unit 22 can request the existing path availability determining unit 21 to again determine whether or not any existing path that can accommodate the route is present. When the existing path availability determining unit 21 determines that the existing path cannot accommodate the route from the new path generating unit 22, the new path generating unit 22 determines at this point of time that a new route should be generated.

In other words, the existing path availability determining unit 21 determines whether or not a route retrieved by the new route retrieving unit 22 and 30 can accommodate the connection of the quality guarantee request if a path already set or scheduled to be set is used. When it is determined as a result of the above determination that a path already set or scheduled to be set cannot accommodate the above route, the request accommodating unit 24 to be described later enters a request to newly generate a path along the retrieved route in the request management database 40.

When the above existing path availability determining unit 21 determines that it is appropriate that the quality guarantee request is executed with an existing path, the existing path attribute changing unit 23 changes path attribute stored in the path management database 50 in order to accommodate the quality guarantee request in the existing path.

In other words, the existing path attribute changing unit 23 functions as an updating unit for updating contents stored in the path management database 50 according to contents of the above quality guarantee request when the existing path availability determining unit 21 determines that the connection of the quality guarantee request can be accommodated in a path already set or scheduled to be set.

Namely, when the existing path availability determining unit 21 determines that the connection of the above quality guarantee request can be accommodated in an existing path already set or scheduled to be set if the attribute of the start time and the end time of the path, the existing path attribute changing unit 23 as being the updating unit updates the attribute of the start time and the end time of the existing path in the path management database 50.

When it is determined as a result of determination by the existing path availability determining unit 21 that an existing path or a new path is used for the quality guarantee request accepted by the acceptance control unit 10, the request accommodating unit 24 reflects the determined contents and the quality guarantee request in the databases 40 through 70.

Practically, the request accommodating unit 24 enters request management information corresponding to the quality guarantee request in the database 40. When the route calculating unit 30 cannot retrieve a route that can be generated as a new path, the quality guarantee request is regarded as a lost call. The request accommodating unit 24 does not accommodate the quality guarantee request regarded as a lost call. Accordingly, the request accommodating unit 24 functions as a request registering unit for entering contents of the quality guarantee request as accepted contents in the request management database 40.

When treatment of the quality guarantee request is determined as above, the request accommodating unit 24 notifies the acceptance control unit 10 of information (acceptability information) showing a result of determination as to whether or not the quality guarantee request is accepted. Whereby, the acceptance control unit 10 can respond to an originator of the request on the basis of the acceptability information from the request accommodating unit 24.

The device setting information forming unit 80 refers to contents of the databases 40 through 70 as being the storing unit, and prepares setting information for setting of the routers 201 through 206. Practically, the device setting information forming unit 80 reads out information from the request management database 40 and the path management database 50 according to a control cycle of the apparatus 100, takes out contents to be newly set or contents of setting to be changed relating to the setting of the routers 201 through 206, forms setting information necessary for device setting, and notifies the device setting unit 90 of it.

The device setting unit 90 receives the setting information prepared by the device setting information forming unit 80, and outputs a control signal for the above device setting to each of the routers 201 through 206.

In other words, the device setting information forming unit 80 and the device setting unit 90 together function as a device setting control unit for controlling setting of the routers 201 through 206 relating to the connection between the edge routers corresponding to the quality guarantee request, while referring to contents stored in the storing unit 40 through 70.

Next, description will be made of a path setting operation by the network controlling apparatus 100 structured as above applied to the MPLS network 200 according to the embodiment of this invention with reference to flowcharts shown in FIGS. 8 and 9.

Figure 8:
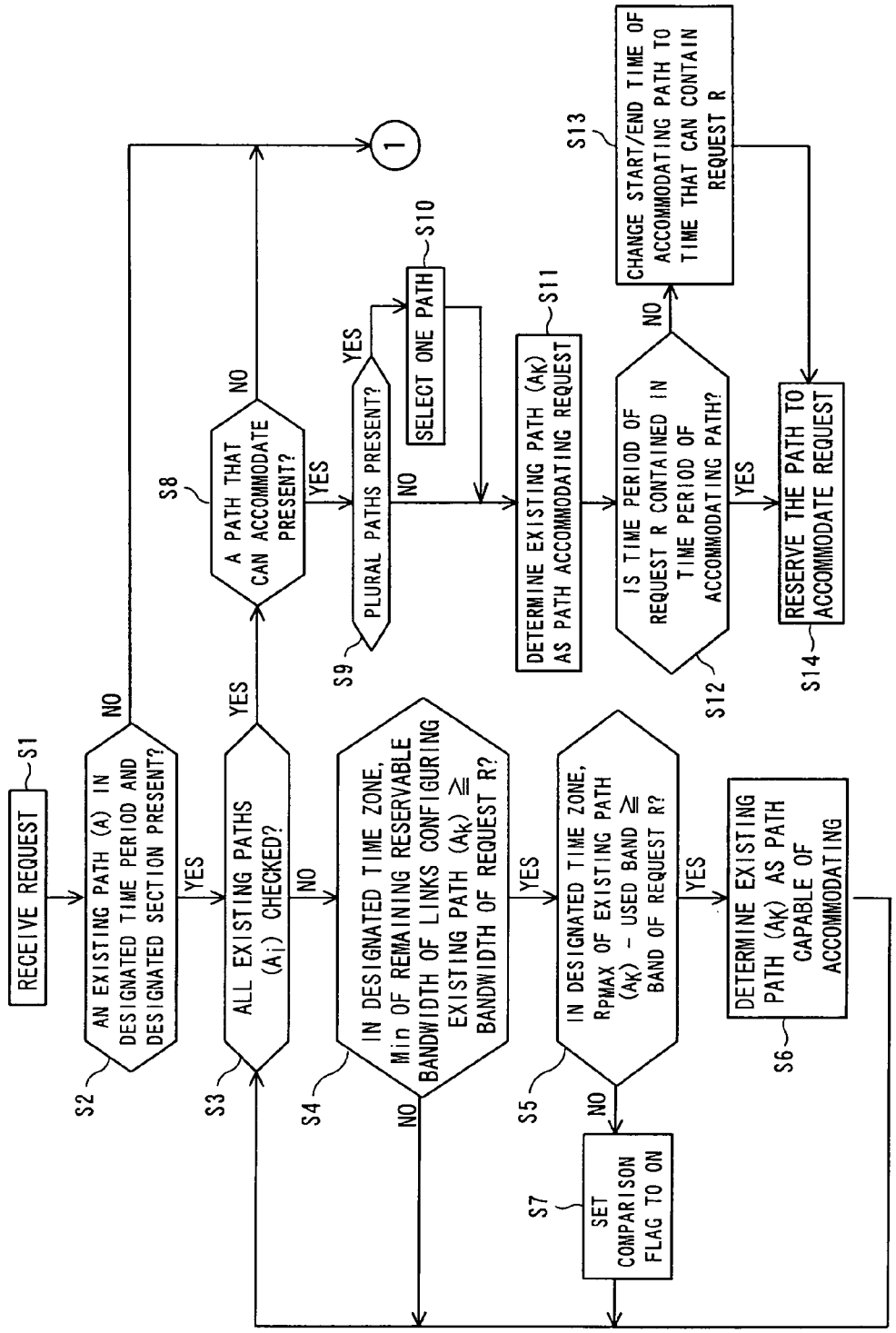
FIGS. 8 and 9 are flowcharts for illustrating a path setting operation of the network controlling apparatus applied to the MPLS network according to the embodiment of this invention.

As shown in FIG. 8, the acceptance control unit 10 receives a quality guarantee request (request R) from a request issuer (step S1). The quality guarantee request R can contain at least identification information on a section between two edge points in the network 200 requested the quality guarantee, bandwidth information on a bandwidth whose quality should be guaranteed (requested bandwidth RB) and start/end time information on a time period from a start to an end of the quality guarantee. Incidentally, as the above identification information on a section between edge points, designated section information defined by two routers performing communication requested the quality guarantee may be used.

When receiving the quality request from the acceptance control unit 10 (quality guarantee request receiving step), the existing path availability determining unit 21 in the QOS control unit 20 refers to the path management database 50 and the link bandwidth management database 60, and determines whether or not there is any path appropriate to execute the quality guarantee request R from the acceptance control unit 10 among existing paths set at present or scheduled to be set (steps S2 to step S8).

Namely, the existing path availability determining unit 21 determines whether or not there is a path which connects a designated section contained in the quality guarantee request R, and is scheduled to be set in at least the designated time period (step S2).

When no existing path satisfying these conditions exists, it is determined that no path appropriate to execute the quality guarantee request R exists among the existing paths (NO route at step S2). Conversely, when an existing path Ai (subscript i identifying each of paths when a plurality of the paths exist) satisfying the conditions exists (YES route at step S2), it is further determined whether or not each of all existing paths satisfying the conditions can accommodate the request R (step S3 to step S7).

Namely, when a path, which is set in the same section as a section between two edge points in the network 200 required the quality guarantee, is set in a time period at least a part of which includes a time zone between the start and end time in the quality guarantee request, and has a remaining bandwidth sufficient to satisfy the quality guarantee request R, is managed in the path management storing unit, the existing path availability determining unit 21 determines that the path can accommodate the connection of the quality guarantee request R.

Practically, the existing path availability determining unit 21 makes determination on each of the relevant existing paths Ai as to whether or not the minimum value of the remaining reservable bandwidths WLAvail in links configuring the relevant existing path Ai satisfying the above conditions is equal to the requested bandwidth RB or more in the designated time zone (NO route at step S3 to step S4).

When the request R designates time slots "4" to "6" as the designated time period, and is a quality guarantee request for a connection between the router 204 and 202 shown in FIG. 2 in a bandwidth of 2 Mbps, the existing path availability determining unit 21 refers to the path management database 50, and takes out the path #1 as a path satisfying the conditions. Then, the existing path availability determining unit 21 takes out reservable bandwidths WLAvail in the links 214 and 212 configuring the relevant path #1 from the link bandwidth management database 60, and determines whether or not the minimum value of these reservable bandwidths WLAvail is not smaller than the requested bandwidth RB.

When the minimum value of the reservable bandwidths WLAvail of the links configuring the path #1 is, for example, 4 Mbps and the requested bandwidth RB is, for example, 2 Mbps, the existing path availability determining unit 21 determines that the minimum value of the reservable bandwidths WLAvail of the links configuring the path #1 is not smaller than the requested bandwidth RB.

When the minimum value of the remaining reservable bandwidths WLAvail of the links configuring a certain existing path Ak of the existing paths Ai is smaller than the requested bandwidth RB, it is determined that the path Ak is not appropriate to execute the request R (NO route at step S4). When there is another existing path satisfying the conditions other than the path #1, that existing path is also determined in the similar manner (NO route at step S3).

When the minimum value of the remaining reservable bandwidths WLAvail of the links configuring a certain existing path Ak in the existing paths Ai is larger than the requested bandwidth RB (YES route at step S4), the existing path availability determining unit 21 further determines whether the minimum value of empty bandwidths each obtained by subtracting the used bandwidth from the maximum assignable bandwidth RPMAX beforehand set is not smaller than the bandwidth RB of the request R when the quality guarantee service is provided with the existing path Ks in the designated time zone (step S5).

When the minimum value of the bandwidths each obtained by subtracting the used bandwidth from the RPMAX is not smaller than the requested bandwidth RB, the path Ak is determined to be a path that can accommodate the request R (step S6). When the minimum value of the bandwidths each obtained by subtracting the used bandwidth from RPMAX is smaller than the requested bandwidth RB, a comparison flag to be described later is set to ON (step S7), and it is determined whether or not the next existing path can accommodate the request R (step S3 to step S7).

In other words, when an existing path is set in the same section as a section between two edge points in the network 200 requested quality guarantee, is set in a time period including all or a part of a time zone between the start time to the end time designated in the quality guarantee request R, has a remaining bandwidth necessary to satisfying the quality guarantee request R, and does not exceed a bandwidth assigned for quality guarantee used for this path in the time zone from the start time to the end time designated in the quality guarantee request if the quality guarantee request R is accommodated in the path, the existing path availability determining unit 21 determines that the existing path can accommodate the connection of the quality guarantee request R.

Figure 10:
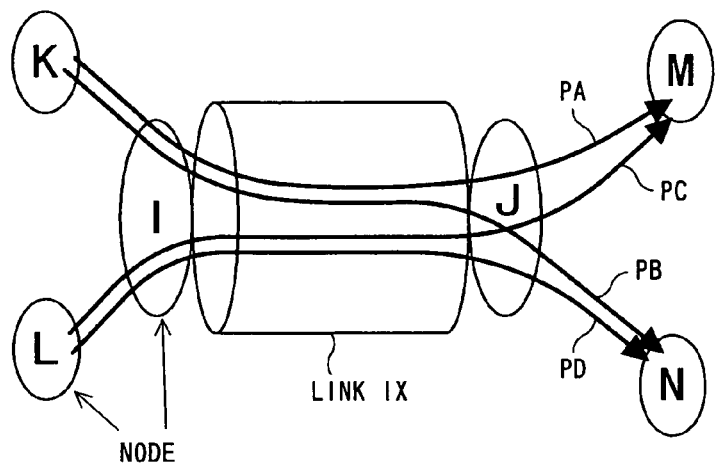
FIGS. 10 and 11 are diagrams for illustrating a relationship between a bandwidth that can be reserved in a link and the maximum bandwidth that can be assigned in an existing path.
Figure 11:
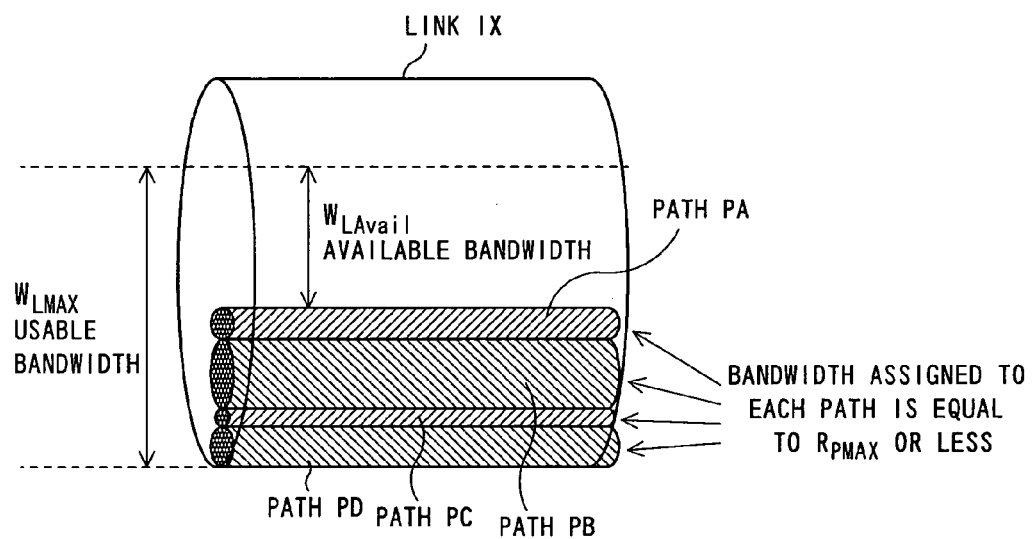

FIGS. 10 and 11 are diagrams for illustrating a relationship between the reservable bandwidth WLAvail and the assignable maximum bandwidth RPMAX of the existing path Ak in a link to be compared with the requested bandwidth RB at the above steps S4 and S5. As shown in FIG. 10, a link IX between nodes I and J is shared by a path PA between edge nodes K and M, a path PB between edge nodes K and N, a path PC between edge nodes L and M, and a path PD between edge nodes L and N.

FIG. 11 is a diagram showing a relationship among bandwidths occupied by the paths PA through PD in the link IX when the paths PA through PD are set through the link IX as shown in FIG. 10. In FIG. 11, the thickness of the cylinder represents a width of the bandwidth, the thickness of a cylinder of the link IX represents the width of the physical bandwidth WL of the link IX, and a sum of the thicknesses of the cylinders of the paths PA through PD represents a magnitude of the sum of bandwidths assigned to respective requests accommodated in the respective paths.

As shown in FIG. 11, a difference between the usable bandwidth WLMAX in the link IX stored in the network information database (refer to FIG. 6) and a total of the bandwidths secured by the above paths PA through PD corresponds to the available remaining bandwidth WLAvail of the link IX stored in the link bandwidth management database 60 (refer to FIG. 5).

When each of the paths PA through PD is set, RPMAX limits the width of each of the paths PA through PD so that the bandwidth of each of the paths PA through PD does not exceed RPMAX. In other words, a bandwidth assigned to each of the paths PA through PD is not greater than RPMAX. That is, a difference between the used bandwidth of each of the paths PA through PD in the link and the above RPMAX is an empty bandwidth of each of the path. When the empty bandwidth is smaller than the bandwidth RD of the request R, it is determined that the request R cannot be accommodated.

Use of a path already set can avoid overhead of the processing. However, when the resource is assigned too many requests on the same route, the use rate of a specific link is increased, which causes a bottle neck. For this, the upper limit RPMAX of the resource assigned to each path is determined. When the assigned bandwidth exceeds PRMAX, another optimum route is retrieved, whereby the link is avoided from being occupied by specific paths. This brings an effect that the use load of the link is dispersed.

As above, determination is made on each of all paths (existing paths) which connect a designated section contained in the quality guarantee request R and are scheduled to be set in at least a part of the designated time period as to whether the path can accommodate the request R. When there is an existing path Ak suited to accommodate the request R and execute it, as a result (YES route at step S3, YES route at step S8), the existing path Ak is determined to be a path accommodating the request R.

When one existing path is obtained as a path that can accommodate the request R, as a result of determination as to whether or not each of the above existing paths can execute the request R, that existing path is determined as a path accommodating the request R (from NO route at step S9 to step S11). When a plurality of existing paths are obtained as the path that can accommodate the request R, a route evaluation value of each of the paths that can accommodate the request R is determined, and one path among them is determined as the path accommodating the request R (from YES route at step S9 to steps S10 and S11).

Figure 12A:
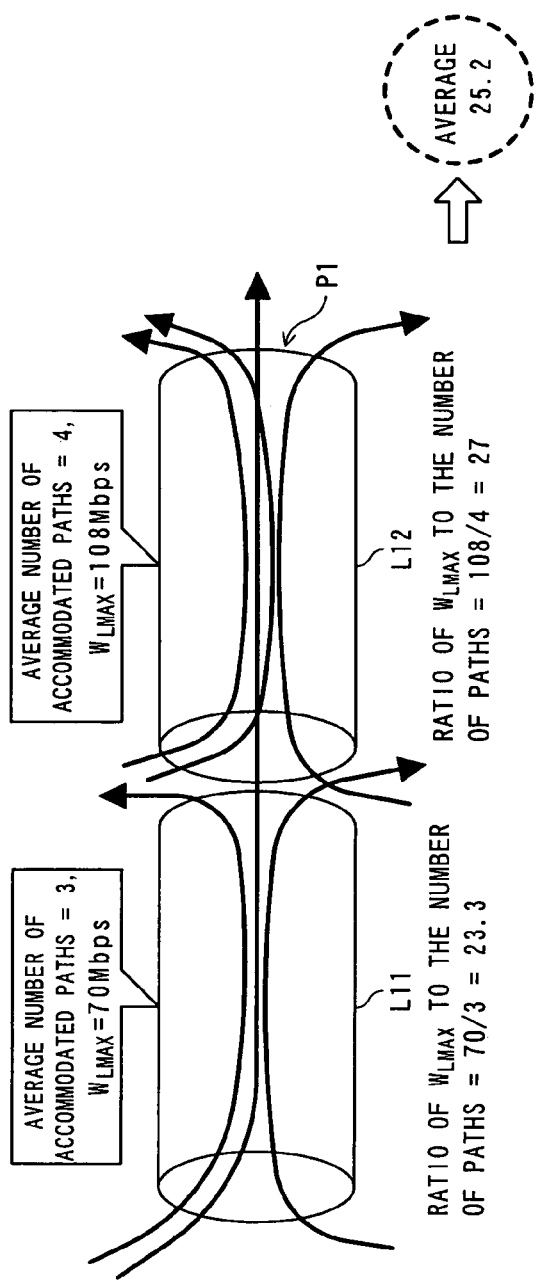
FIGS. 12(a) and 12(b) are diagrams for illustrating an example of method of determining one path accommodating a request R according to a determined route evaluation value of a path that can accommodate the request R.
Figure 12B:
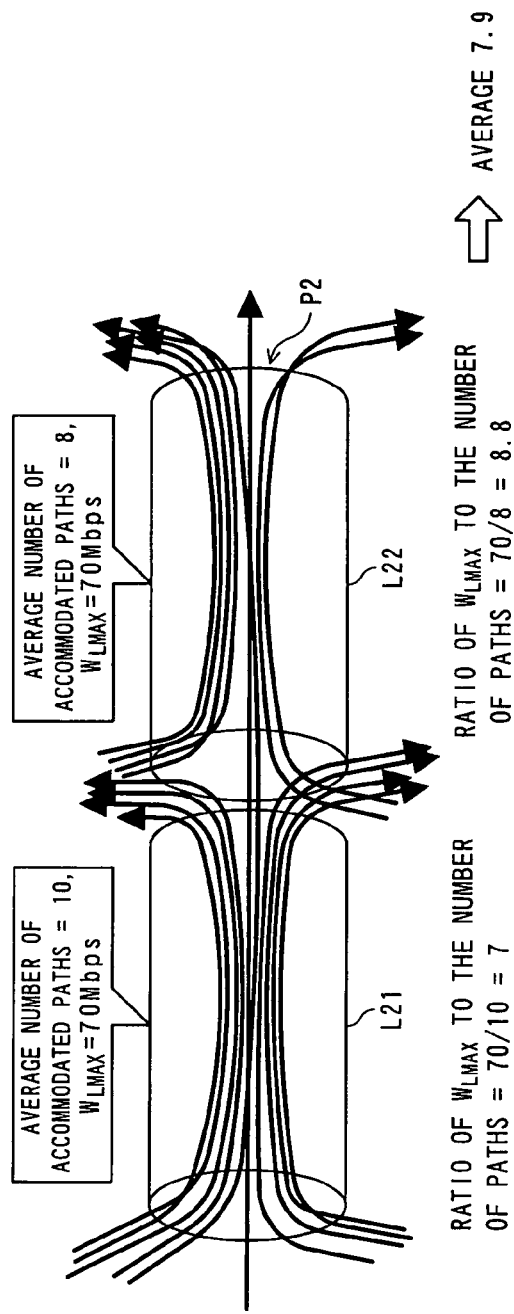

FIGS. 12(a) and 12(b) are diagrams for illustrating an example of the method for determining one path that accommodates the request R on the basis of a route evaluation value for a path that can accommodate the request. When a plurality of paths are obtained as an existing path that can accommodate the request R, the existing path availability determining unit 21 refers to the link bandwidth management database 60, obtains a ratio of a usable bandwidth WLMAX of a link configuring the existing path to the number of used paths (Npath) in the requested time zone, calculates an average value (ratio average value) of the obtained ratios as the above route evaluation value, and determines an existing path having the minimum average value as the path accommodating the request R.

When a path P1 of two hops shown in FIG. 12(a) and a path P2 of two hops shown in FIG. 12(b) are obtained as the path that can accommodate the request R, the ratio average value of the path P1 is "25.2," while the ratio average value of the path P2 is "7.9."

Accordingly, the path P1 having a larger ratio average value is specified as the existing path accommodating the request R.

Namely, the ratio average value of the path P1 is determined as follows. When the number of average accommodated paths in the requested time zone in the first link L11 of the path P1 is three and the usable bandwidth WLMAX is 70 Mbps, a value of the above ratio is "23.3." When the number of average accommodated paths in the requested time zone in the second link L12 of the path P1 is four and the usable bandwidth WLMAX is 108 Mbps, a value of the above ratio is "27." Accordingly, the ratio average value of the path P1 is "25.2," which is an average of "23.3" and "27."

On the other hand, a ratio average value of the path P2 is determined as follows. When the number of average accommodated paths in the requested time zone in the first link L21 of the path P2 is 10 and the usable bandwidth WLMAX is 70 Mbps, a value of the above ratio is "7." When the number of average accommodated paths in the requested time zone in the second link L22 of the path P2 is eight and the usable bandwidth WLMAX is 70 Mbps, a value of the above ratio is "8.8." Accordingly, the ratio average value of the path P2 is "7.9," which is an average of "7" and "8.8."

By making determination using such ratio average values, it becomes possible to accommodate the request in an existing path configured with links holding a smaller number of set paths. It is therefore possible to increase the available bandwidth by one path, and efficiently accommodate more requests in an existing path. Namely, it is possible to increase the degree of intensiveness of flows accommodated in the path, thus wasteful path setting can be decreased.

When the available bandwidths WLMAX of links configuring the network are all equal, an average value of the number of paths using the link in the requested time zone may be employed as the above route evaluation value, and a path having a smaller average value may be specified as the path accommodating the request R.

When an existing path accommodating the request R is determined as above, it is then determined with respect to the set period of the existing path whether or not the requested period requested in the request R is contained in the set period of the existing path Ak accommodating the request R (step S12).

When the requested period requested in the request R is contained in the set period of the existing path Ak accommodating the request R (YES route at step S12), the existing path is reserved to accommodate the request R. Namely, the existing path availability determining unit 21 requests the existing path attribute changing unit 23 and the request accommodating unit 24 to update contents of the databases 40 through 70 in order to accommodate the request R in the existing path Ak (step S14).

When the requested period requested in the request R is not contained in the set period of the existing path Ak accommodating the request R, the start time and the end time of the path accommodating the request R are changed so that they can contain the request R (can contain the designated time period in the request R) (from NO route at step S12 to step S13), thereafter, the existing path is reserved to accommodate the request R in the similar manner to the above (step S14). At this time, the existing path attribute changing unit 23 and the request accommodating unit 24 may collectively carry out setting of the start time and the end time of the accommodating path at step S13 and update of the databases 40 through 70 at step S14.

Whereby, the device setting information forming unit 80 refers to contents of the request management database 40, prepares device setting information for accommodating the request R in the existing path, and sets and controls the routers 201 through 206 through the device setting unit 90. In other words, through the processes in the QOS control unit 20, the device setting information forming unit 80 and the device setting unit 90, it is possible to set the routers 201 through 206 in order to set a path coping with the quality guarantee request (controlling step).

Figure 13:
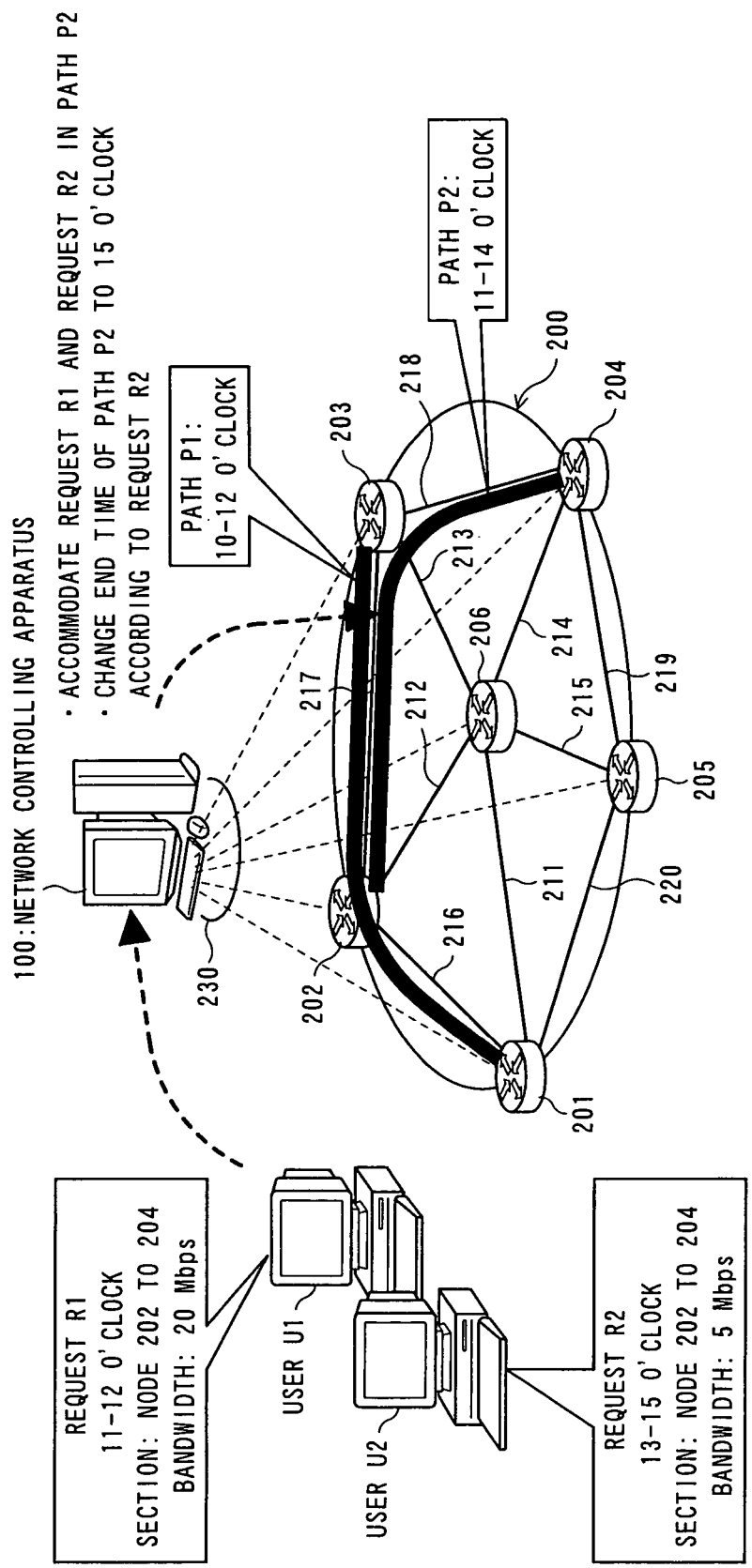
FIG. 13 is a diagram for illustrating an operation according to the embodiment of this invention.

FIGS. 13, 14(a) and 14(b) are diagrams illustrating an example where the request R is accommodated in an existing path Ak through the above steps S1 through S14.

In the example shown in FIGS. 13, 14(a) and 14(b), a unit time of the time slot is one hour, the physical bandwidth of each link is 100 Mbps, and the usable bandwidth WLMAX is 70 Mbps. In the network controlling apparatus 100 according to this embodiment, the links, the state of bandwidth assignment and paths (routes) of the network 200 are managed in the databases 40 through 70. When the acceptance control unit 10 receives the quality guarantee request R, the existing path availability determining unit 21 determines whether to accept the quality guarantee request R with an existing path managed in the databases 40 through 70 or generate a new path, and the device setting unit 90 sets the routers 201 through 206 as being practical network devices.

As shown in FIG. 13, a bandwidth guaranteed path P1 (whose route is connected between the node 201 and the node 203) is scheduled to be set in a section between the node 201 and the node 203 from 10 to 12 o'clock, and a bandwidth request for 30 Mbps from 10 to 12 o'clock has been already accepted. Additionally, a bandwidth guaranteed path P2 (whose route is connected between the node 202 and the node 204) is scheduled to be set in a section between the node 202 and the node 204 from 11 to 14 o'clock, and a bandwidth request for 15 Mbps from 11 to 14 o'clock has been already accepted. FIG. 14(a) is a diagram showing a portion of information to be used in this example in the link bandwidth management database 60 and the path management database 50 in the case where the above network setting is done. In the portion of the link bandwidth management database 60, secured bandwidth (available remaining bandwidth) and the number of paths in each link are shown in each time slot. In the portion of the path management database 50, a bandwidth secured by each path is shown in each time slot.

In this situation, when a user U1 makes a quality guarantee request R1 for a bandwidth 20 Mbps in a section between node 202 and node 204 in a time zone from 11 to 12 o'clock, a path P2 exists in this section and in this time zone, and bandwidths of 45 Mbps and 15 Mbps have been already assigned to links 217 and 218 configuring the path P2 from 11 to 12 o'clock. Namely, since the available remaining bandwidths of these links are 25 Mbps and 55 Mbps, respectively, no hindrance occurs if the links accommodate the bandwidth of 20 Mbps of the request R1. Accordingly, the network controlling apparatus 100 determines that the request R1 can be accepted with the path P2, and accepts the request R1 without generating a new path (refer to YES route at step S12 to step S14).

Further, when another user U2 makes a quality guarantee request R2 for a bandwidth 5 Mbps in a section between the node 202 and the node 204 in a time zone from 13 to 15 o'clock, the network controlling apparatus 100 determines that the request R2 from the user U2 can be accepted with the path P2, and accepts the request R2 without generating a new path because the path P2 can accommodate the request R2 by elongating the end time of the path P2 to 15 o'clock, and there are sufficient empty bandwidths in the links 217 and 218 (from NO route at step S12 to steps S13 and S14).

When the requests R1 and R2 from the users U1 and U2 are accepted, the existing path attribute changing unit 23 can update contents of the link bandwidth management database 60 and the path management database 50 as shown in FIG. 14(a) to contents as shown in FIG. 14(b) according to an instruction from the existing path availability determining unit 21.

Figure 9:
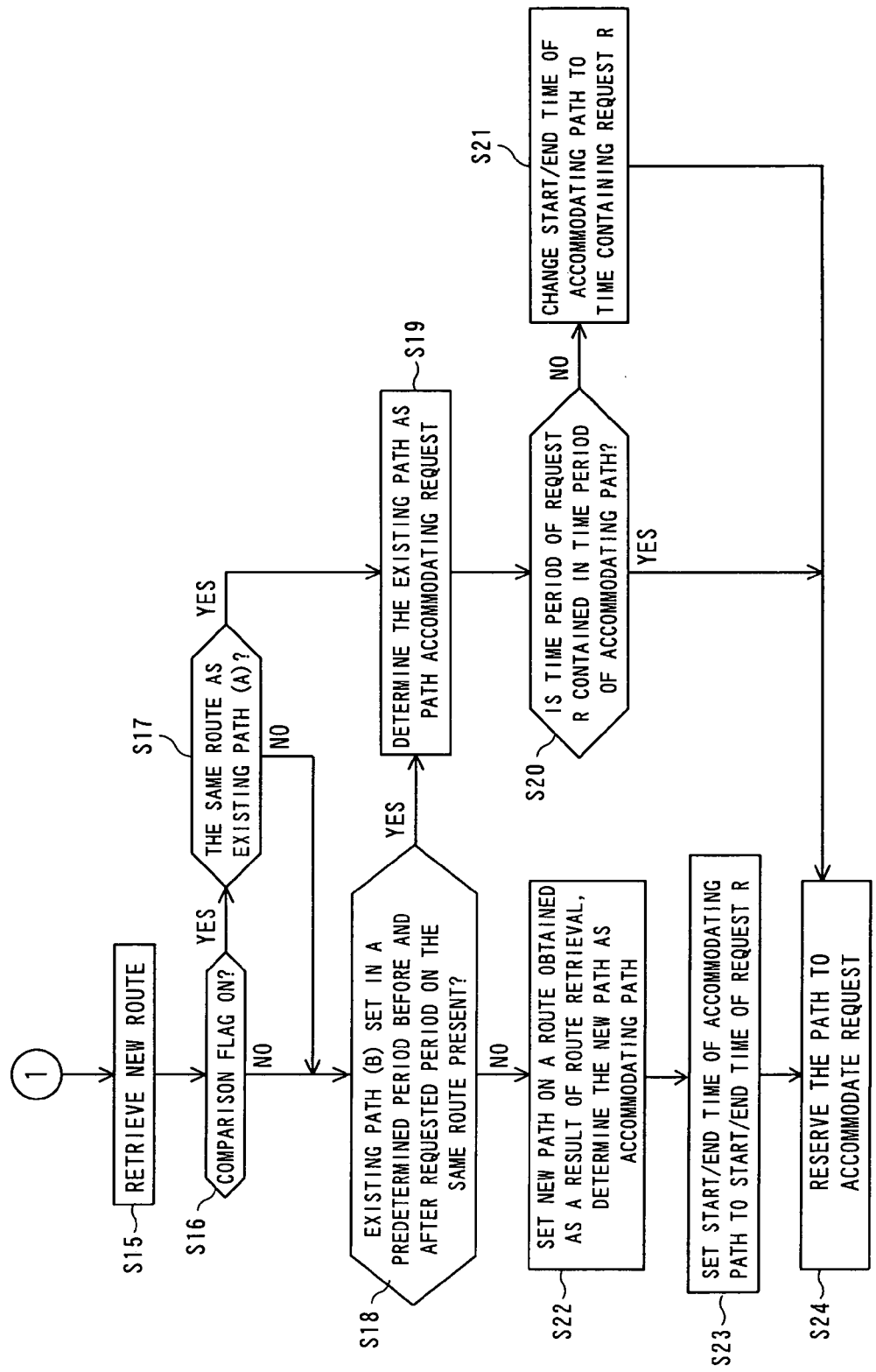

When it is determined at step S2 shown in FIG. 8 that there is no path (existing path) which connects a designated section contained in the quality guarantee request R and is scheduled to be set in at least a part of the designated time, or when it is determined at step S8 that there is no path that can accommodate the quality guarantee request R even though there is such the existing path, the existing path availability determining unit 21 instructs the new path generating unit 22 to retrieve a new path, as shown in FIG. 9 (step S15).

Namely, the new path generating unit 22 generates the network information for route calculation 110 (refer to FIG. 7), hands it to the route calculating unit 30, thereby to request the route calculating unit 30 to calculate an optimum new route satisfying the requested designated section, designated time zone, and bandwidth in the request R. Practically, the new path generating unit 22 and the route calculating unit 30 retrieves a route on the basis of the network information for route calculation (topology map for route retrieval) 110 in the following procedure.

The new path generating unit 22 excludes (a) link(s) in which a bandwidth necessary to satisfy the requested quality cannot be assigned from links configuring the network in the network information for route retrieval 110. The new path generating unit 22 retrieves a route through route calculation by the route calculating unit 30 with obtained network information for route retrieval. In other words, the new route retrieving unit 22 and 30 retrieves a route with a connection whose remaining bandwidth assignable for quality guarantee always satisfies the quality guarantee request R in a time zone from the start time to the end time in the quality guarantee request R.

For example, the cost of a link is calculated with a value of assignable remaining bandwidth WLAvail transiting in the requested time zone (time zone from the start time to the end time in the quality guarantee request), and the optimum route can be retrieved with a result of the calculation. Practically, the route retrieval is possible with a reciprocal of the minimum value of the assignable remaining bandwidths WLAvail on the route within the requested time zone, or an average value (average available remaining bandwidth) of the assignable bandwidths WLAvail within the requested time zone.

With route retrieval using a reciprocal of the minimum value of the assignable remaining bandwidths within the requested time zone, it is possible to retrieve a route so that the minimum value of the assignable remaining bandwidths is kept maximum in every link. Whereby, it is possible to disperse the load of the use rate of the links, and prevent a new request occurring thereafter from being a lost call because WLAvial in a part of the links is small.

Alternatively, it is possible to calculate the cost of the link in route retrieval with a value of the number of paths (Npath) using the link, and retrieve the optimum route with the cost. Practically, the maximum value (the maximum number of paths) of paths using the link within the requested time zone or an average value (average number of paths) of the number of paths using the link is used to retrieve a route.

When a plurality of routes are retrieved as candidates as a result of retrieval of a new route by the new route retrieving unit 22 and 30, the existing path availability determining unit 21 calculates the route evaluation value in a manner similar to that carried out at step S10, and specifies one route as a result of retrieval on the basis of a result of the calculation.

When a result of retrieval of a new route coping with the request R is obtained by the new path generating unit 22 and the route calculating unit 30, the existing path availability determining unit 21 again determines on the basis of this retrieval result whether or not an existing path can be used. When an existing path cannot be used, a new path is generated.

Practically, when there is no existing path whose comparison flag is "ON" at the above step S7 (NO route at step S16) and there is no existing path B set within a predetermined time period before and after the requested time zone on the same route as the retrieved route (NO route at step S18), a new path is set along the route which is obtained as a result of the route retrieval at this time, and the new path is determined as the accommodating path (step S22).

When, even if there is an existing path whose comparison flag is ON (YES route at step S16), when a route obtained as a result of the retrieval is not the same as the route of the existing path whose comparison flag is ON (NO route at step S17) and there is no existing path B set in a predetermined time period before and after the requested time zone on the same route as the retrieved route (NO route at step S18), a new path is set along a route obtained as a result of the route retrieval at this point of time, and this new path is determined to be the accommodating path (step S22).

The existing path availability determining unit 21 outputs an instruction to the request accommodating unit 24 in order to generate a new path along the retrieved route. The request accommodating unit 24 updates the contents of the databases 40 through 70 in order to newly generate a path along the retrieved route. On this occasion, the request accommodating unit 24 adjusts the start time and the end time of the newly set path on the retrieved route to the start time and the end time in the request R, and set so (steps S23 and S24).

The device setting information forming unit 80 refers to contents of the request management database 40, forms device setting information for newly generating a path on the retrieved route, and sets and controls the routers 201 through 206 through the device setting unit 90. In other words, it is possible to control the setting of the routers 201 through 206 through the processing in the QOS control unit 20, the route calculating unit 30, the device setting information forming unit 80 and the device setting unit 90 so that the setting of the path meets the quality guarantee request (controlling step).

Figure 15:
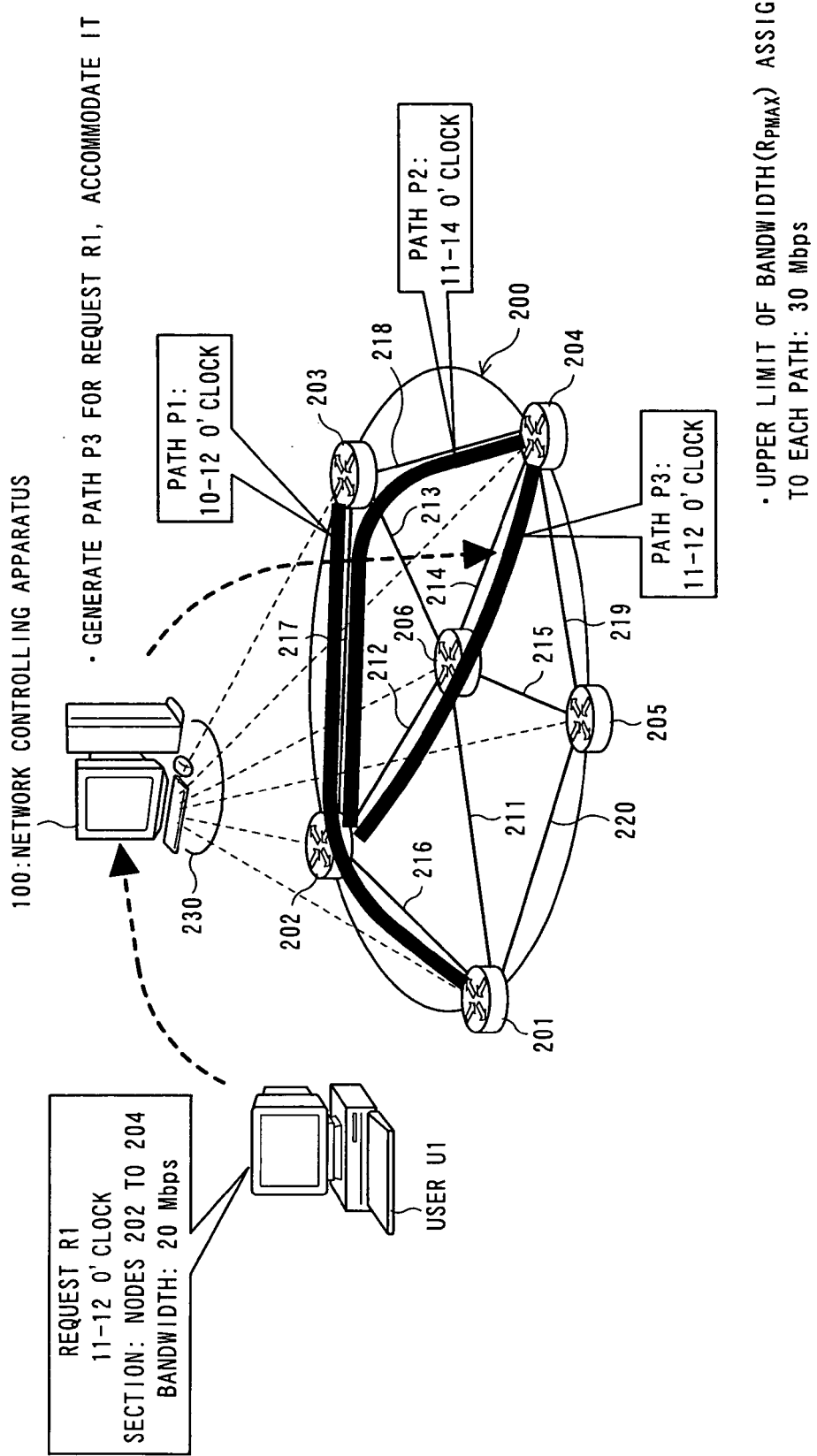
FIG. 15 is a diagram for illustrating an operation according to the embodiment of this invention.

FIGS. 15, 16(a) and 16(b) are diagrams showing an example in which a new path is generated along the new route retrieved at the above step S15, and the request R is accommodated in the new path (steps S22 to S24).

Like the case shown in FIG. 13, a bandwidth guaranteed path P1 (whose route is from the node 201 to the node 203 via the node 202) from the node 201 to the node 203 is scheduled to be set from 10 to 12 o'clock, and a request for 30 Mbps from 10 to 12 o'clock has been already accepted.

Additionally, a bandwidth guaranteed path P2 (whose route is from the node 202 to the node 204 via the node 203) in a section between the node 202 and the node 204 from 11 to 14 o'clock is scheduled to be set, and a request for a bandwidth of 15 Mbps from 11 to 14 o'clock has been already accepted. Further, RPMAX (the upper limit of a bandwidth that can be assigned to each path) which is to be compared at step S5, is 30 Mbps, in this case.

In such situation, when a user U1 makes a quality request R1 for a bandwidth of 20 Mbps in a section from the node 202 to the node 204 in a time zone from 11 to 12 o'clock, the path P2 exists in this section and this time zone, and bandwidths of 45 Mbps and 15 Mbps have been assigned from 11 to 12 o'clock to links 217 and 218 configuring the path P2. Namely, the usable remaining bandwidths of the links are 25 Mbps and 55 Mbps, respectively. Accordingly, no hindrance arises if the request R1 for 20 Mbps is accommodated therein.

When the request R1 is accommodated in the path P2, the maximum value of a bandwidth to be assigned to the path P2 is 35 Mbps, which exceeds RPMAX. For this, the new path generating unit 22 and the route calculating unit 30 try to retrieve a more suitable route in order to accommodate the request from the user U1. As a result, a new optimum route from the node 202 to the node 204 via the node 206 can be obtained as a result of the retrieval.

When there is an existing path whose comparison flag is ON at step S7 if a result of retrieval of a new route satisfying the request R is obtained by the new path generating unit 22 and the route calculating unit 30 as above at step S15 in the flowchart shown in FIG. 9 (YES route at step S16), the existing path availability determining unit 21 determines whether or not the route obtained as a result of the retrieval is the same route as that of the existing path whose comparison flag is ON (step S17).

When the route obtained as a result of the retrieval is determined to be the same route as that of the existing path A whose comparison flag is ON, the existing path whose comparison flag is ON is determined as a path accommodating the request R (from YES route at step s17 to step S19). At this time, a secured bandwidth of the existing path exceeds RPMAX. However, that the route of the retrieved optimal new path is the same as the route of the existing path signifies that the route of the new path is optimal even if it exceeds RPMAX. For this, the secured bandwidth exceeding RPMAX is allowed only this case.

When there is an existing path B set within a predetermined time period before and after the requested time zone on the same route as the retrieved route even if it is determined that the route obtained as a result of the retrieval is not the same route as the existing path whose comparison flag is ON (NO route at step S17), the existing path B is determined to be a path accommodating the request R (from YES route at step S18 to step S19).

When an existing path accommodating the request R is determined, it is then determined whether or not the requested time period, which is requested as the request R, is contained in a set period of the accommodating existing path (step S20).

When the requested period, which is requested as the request R, is contained in the set period of the accommodating path (YES route at step S20), the existing path is reserved to accommodate the request R. The existing path availability determining unit 21 requests the existing path attribute changing unit 23 and the request accommodating unit 24 to update the contents of the databases 40 through 70 in order to accommodate the request R in the existing path A (step S24).

When the requested period, which is requested as the request R, is not contained in the set period of the accommodating existing path, the start time and the end time of the accommodating path are changed so that they can contain the request R (from NO route at step S20 to step S21). Thereafter, the existing path is reserved to accommodate the request R in the existing path, like the above case (step S24). At this time, the existing path attribute changing unit 23 and the request accommodating unit 24 may collectively carry out setting of the start time and the end time of the accommodating path at step S21 and the update of the databases 40 through 70 at step S24.

As described above, an existing path set on the same route as the retrieved route and set in a predetermined time period before and after the requested time zone is determined to accommodate the request R. This is because setting of a path on the same route with a short interval is a wasteful process in consideration of the processing overhead. For this, the above treatment is to avoid the wasteful process. Meanwhile, a short interval, that is, how long the predetermined time period before and after the requested time zone is, may be arbitrarily set according to the network policy or the like.

The device setting information forming unit 80 refers to contents of the request management database 40, forms device setting information for newly generating a path along the retrieved route, and sets and controls the routers 201 through 206 through the device setting unit 90. In other words, through the processes by the QOS control unit 20, the route calculating unit 30, the device setting information forming unit 80 and the device setting unit 90, it is possible to control the setting of the routers 201 through 206 in order to set a path coping with the quality guarantee request (controlling step).

In retrieval of a new route by the new route retrieving unit 22 and 30, when the existing path availability determining unit 21 retrieves a route whose requested time partly overlaps on an existing path in the same section, the existing path attribute changing unit 23 changes the set time period of the existing path to accommodate the request therein. It is therefore possible to dynamically determine an appropriate holding time of the existing path according to the state of occurrence of requests. Additionally, it is possibly to avoid frequent execution of the path setting process.

Figure 17:
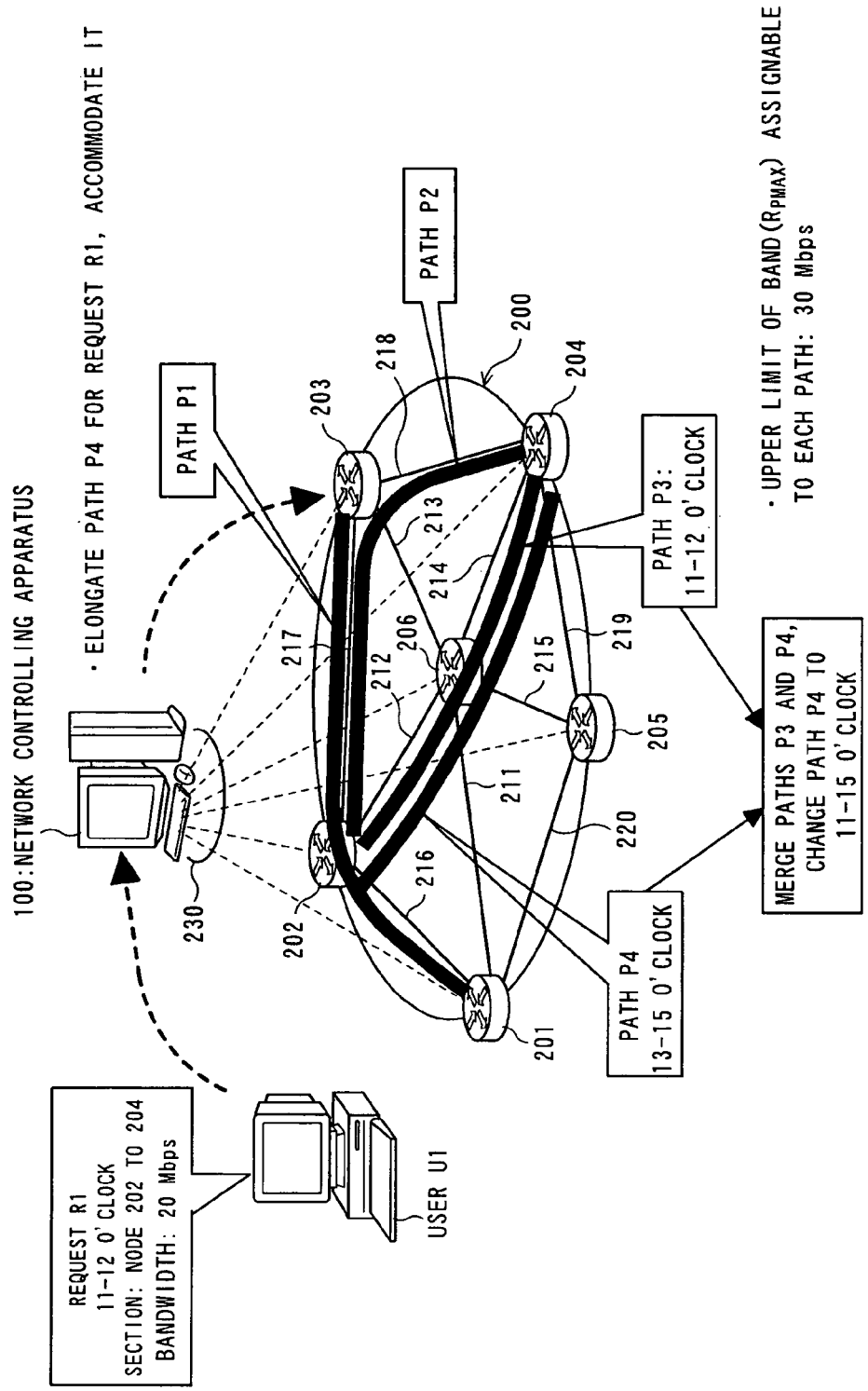
FIG. 17 is a diagram for illustrating an operation according to the embodiment of this invention.

FIGS. 17, 18(*a*) and 18(*b*) are diagrams illustrating an example in which, when it is determined that a new route retrieved at the above step S15 is on the same route as that of an existing path whose comparison flag is ON, or when it is determined there is an existing path set in a predetermined time period before and after the requested time zone on the same route as a retrieved route, the existing path is determined to be the path accommodating the request R (refer to steps S19 through S21, and S24).

In the case of FIG. 15, assuming here that there is another path P4 as being an existing path set in a predetermined time period before and after the requested time zone on the same route as the retrieved route (route from the router 202 to the router 204 via the router 206) when the route is retrieved by the new path generating unit and the route calculating unit 30.

As shown in FIG. 17, in a situation where the existing path P4 is scheduled to be set on the same route as the above retrieved route from 13 to 15 o'clock, it causes an increase in network control overhead that a path on the same route is set from 11 o'clock, the path P3 to be ended at 12 o'clock is set, then the path P4 is again set from 13 o'clock.

For this, by advancing the start time of the existing path P4 to 11 o'clock, not by generating the path P3, it is possible to accommodate the request R1 in the path P4. In other words, if there are paths which are to be generated at near generating time on the same route, the paths are merged, whereby wasteful path setting is omitted. Accordingly, it becomes unnecessary to generate a redundant path, and it is possible to suppress an increase in the network control overhead.

FIG. 18(*a*) shows the pass management database 50 and the link bandwidth management database 60 which are updated in order to generate a new path satisfying the request R when the above path P4 is scheduled to be generated. FIG. 18(*b*) shows portions of the path management database 50 and the link bandwidth management database 60 updated in order to accommodate the request R1 in the path P4 when the above P4 is scheduled to be generated.

When a new path is generated, contents of the path P3 is written in the path management database 50 as shown in FIG. 18(*a*). When the request R1 is accommodated in the existing path P4, it is sufficient to only change the attribute of P4 in the path management database 50 as shown in FIG. 18(*b*).

According to the embodiment of this invention, a generated path can be appropriately arranged in each time period, according to a change in section and bandwidth requested in each time period, by the QOS control unit 20, the route calculating unit 30, the device setting information forming unit 80 and the device setting unit 90 as being the control unit. It is therefore possible to flexibly generate a path according to the state of occurrence of requests, improve the efficiency of the path setting process, and optimize the use efficiency of the network resource.

When it is desired to assign the resource along the most suitable route in response to a quality guarantee request of a reservation type, a path having been already assigned in response to a quality guarantee request is used if it is determined that use of the path is appropriate, thereby decreasing the overhead of the assigning process. When it is determined that use of the path is not appropriate, a new path is retrieved, paths are re-arranged (re-set) according to a new situation when the situation changes, thereby optimize the efficiency of use of the resource.

The existing path availability determining unit 21, the existing path attribute changing unit 23 and the request accommodating unit 24 can accommodate a newly accepted quality guarantee request in an existing path, which has been already set or is scheduled to be set, thereby to decrease the overhead of the resource assigning process.

The present invention is not limited to the above example, but may be modified in various ways without departing from the scope of the invention.

For example, in the above embodiment, this invention is applied to the MPLS network 200 configured with the six routers 201 through 206. But, this invention is not limited to the above, but may be applied to an MPLS network having another topology configuration, as a matter of course.

It is possible to manufacture the apparatus of this invention according to the above embodiment.

What is claimed is:

1. In a network configured by connecting a plurality of network devices to one another, a network controlling apparatus for controlling setting of a path for carrying out communication between two network devices in said network comprising:
   a storing unit for storing information for managing said network; and
   a controlling unit for controlling setting of said network devices relating to a connection at two edge points in said network to obtain path setting meeting a quality guarantee request of a reservation type for said connection, using a path already set or scheduled to be set, or a newly generated path, by referring to said information stored in said storing unit when receiving said quality guarantee request, wherein
   said storing unit comprises:
      a path management storing unit for storing management information on said path already set or scheduled to be set;
      a link information storing unit for storing information about connections among said network devices configuring said network as link information;
      a request contents storing unit for storing contents of an accepted quality guarantee request; and
      a network device management information storing unit for storing management information on each of said network devices configuring said network; and
   said controlling unit comprises:
      an existing path accommodation capability determining unit for determining whether or not the connection of said quality guarantee request can be accommodated in said path already set or scheduled to be set on the basis of contents of said quality guarantee request and contents stored in said path management storing unit and said link information storing unit;
      an updating unit for updating the contents stored in said path management storing unit according to the contents of said quality guarantee request when said existing path accommodation capability determining unit determines that the connection of said quality guarantee request can be accommodated in said path already set or scheduled to be set;
      a request registering unit for entering the contents of said quality guarantee request as accepted contents in said request contents storing unit; and
      a new route retrieving unit for newly retrieving a route for said connection on the basis of contents stored in said link information storing unit and said network device management information storing unit when said existing path accommodation capability determining unit determines that the connection of said quality guarantee request cannot be accommodated in said path already set or scheduled to be set.

2. The network controlling apparatus according to claim 1, wherein, in said controlling unit, when said existing path accommodation capability determining unit determines that the connection of said quality guarantee request can be accommodated in said path already set or scheduled to be set, by changing attribute of a start time and an end time in setting of said path already set or scheduled to be set, said updating unit updates the attribute of the start time and the end time of setting of said path already set or scheduled to be set.

3. The network controlling apparatus according to claim 1, wherein said existing path accommodation capability determining unit determines whether or not a retrieved route retrieved by said new route retrieving unit can be accommodated in said path already set or scheduled to be set, so that said existing path accommodation capability determining unit determines whether or not the connection of said quality guarantee request can be accommodated in said path already set or scheduled to be set along said retrieved route.

4. The network controlling apparatus according to claim 3, wherein when said existing path accommodation capability determining unit determines as a result of determination on said retrieved route that the connection of said quality guarantee request cannot be accommodated in said path already set or scheduled to be set along said retrieved route, said request registering unit enters a request for newly generating a path along said retrieved route in said request contents storing unit.

5. The network controlling apparatus according to claim 3, when said existing path accommodation capability determining unit determines as a result of determination on said retrieved route that the connection of said quality guarantee request can be accommodated in said path already set or scheduled to be set along said retrieved route, a path is not newly generated along said route retrieved by said new route retrieving unit, but contents stored in said path management storing unit are updated according to the contents of said quality guarantee request by said updating unit, and said request registering unit enters the contents of said quality guarantee request in said request contents storing unit.

6. The network controlling apparatus according to claim 1, wherein said controlling unit comprises:
   a device setting controlling unit for controlling setting of network devices relating to said connection while referring to contents stored in said storing unit.

7. The network controlling apparatus according to claim 1, wherein said controlling unit receives said quality guarantee request containing identification information on a quality guarantee requested section between two edge points in said network, information on a quality guarantee requested bandwidth, and start/end time information from a start time to an end time of said quality guarantee request;
   when said path management storing unit manages a path which includes the same section as said section between the two edge points in said quality guarantee request, is set in a time period containing a time zone from the start time to the end time in said quality guarantee request, and has a remaining bandwidth sufficient to satisfy said quality guarantee request, said existing path accommodation capability determining unit determines that the connection of said quality guarantee request can be accommodated in said path.

8. The network controlling apparatus according to claim 7, wherein when said path management storing unit manages a path which is set in the same section as said quality guarantee requested section between the two edge points in said network, is set in a time period partly containing the time zone from the start time to the end time in said quality guarantee request, and has a remaining bandwidth sufficient to satisfy said quality guarantee request, said existing path accommodation capability determining unit determines that the connection of said quality guarantee request can be accommodated in said path as well; and
   said updating unit updates attribute of a start time to an end time of setting of said path so that a time period from the start time to the end time of said path contains the time zone from the start to the end time in said quality guarantee request.

9. The network controlling apparatus according to claim 1, wherein said controlling unit receives said quality guarantee request containing identification information on a quality guarantee requested section between two edge points in said network, information on a quality guarantee requested bandwidth, and start/end time information from a start time to an end time of said quality guarantee request;

the existing path accommodation capability determining unit determines that the connection of said quality guarantee request can be accommodated in a path when said path is set in the same section as said quality guarantee requested section between the two edge points in said network, is set in a time period containing all or a part of a time zone from the start time to the end time in said quality guarantee request, and has a remaining bandwidth sufficient to satisfy said quality guarantee request, and a bandwidth of said path does not exceed a bandwidth assigned for quality guarantee to be used for said path in the time zone from the start time to the end time in said quality guarantee request if the connection of said quality guarantee request is accommodated in said path.

10. The network controlling apparatus according to claim 1 further comprising:

a request accepting unit for receiving said quality guarantee request, and passing said received quality guarantee request to said controlling unit;

wherein said request accepting unit collects a plurality of quality guarantee requests, and passes said quality guarantee requests to said controlling unit.

11. The network controlling apparatus according to claim 1, wherein said link information storing unit stores information on a remaining bandwidth assignable for quality guarantee in each time zone of each connection between said network devices as said link information; and said new route retrieving unit performs said route retrieval using a connection in which said remaining bandwidth assignable for quality guarantee always satisfies said quality guarantee request in a time zone from a start time to an end time of a quality guarantee requested in said quality guarantee request.

12. The network controlling apparatus according to claim 1, wherein said link information storing unit stores information on a remaining bandwidth assignable for quality guarantee in each time zone of each connection between said network devices as said link information; and said new route retrieving unit calculates a cost on the basis of the information on a remaining bandwidth assignable for quality guarantee in a time zone from a start time to an end time requested in said quality guarantee request, and retrieves an optimum route on the basis of a result of the calculation.

13. The network controlling apparatus according to claim 11, wherein when said new route retrieving unit retrieves a plurality of routes as candidates, said retrieving unit calculates a route evaluation value of each of said plurality of routes with a value of the number of paths using in each connection between network devices configuring the route, which varies within a time zone containing the start time to the end time in said quality guarantee request, and a bandwidth assignable to the connection between the network devices, said new route retrieving unit determining one optimum route as a result of the retrieval on the basis of said route evaluation value.

14. The network controlling apparatus according to claim 12, wherein when said new route retrieving unit retrieves a plurality of routes as candidates, said retrieving unit calculates a route evaluation value of each of said plurality of routes with a value of the number of paths using in each connection between network devices configuring the route, which varies within a time zone containing the start time to the end time in said quality guarantee request, and a bandwidth assignable to the connection between the network devices, said new route retrieving unit determining one optimum route as a result of the retrieval on the basis of said route evaluation value.

15. A path controlling method of a network controlling apparatus for controlling setting of a path for connecting two network devices in a network configured by connecting a plurality of network devices to one another, comprising the steps of:

a storing step of storing information for managing said network;

a quality guarantee request receiving step of receiving a quality guarantee request of a reservation type for a connection between network devices at two edge points in said network; and a controlling step of controlling setting of said network devices relating to said connection to set a path satisfying said quality guarantee request using a path already set or scheduled to be set, or a newly generated path, by referring to the stored information for managing said network, wherein said storing step comprises the steps of:

a path management storing step for storing management information on said path already set or scheduled to be set;

a link information storing step for storing information about connections among said network devices configuring said network as link information;

a request contents storing step for storing contents of an accepted quality guarantee request; and a network device management information storing step for storing management information on each of said network devices configuring said network; and said controlling step comprises:

an existing path accommodation capability determining step for determining whether or not the connection of said quality guarantee request can be accommodated in said path already set or scheduled to be set on the basis of contents of said quality guarantee request and contents stored in said path management storing step and said link information storing step;

an updating step for updating the contents stored in said path management storing step according to the contents of said quality guarantee request when said existing path accommodation capability determining step determines that the connection of said quality guarantee request can be accommodated in said path already set or scheduled to be set;

a request registering step for entering the contents of said quality guarantee request as accepted contents in said request contents storing step; and a new route retrieving step for newly retrieving a route for said connection on the basis of contents stored in said link information storing step and said network device management information storing step when said existing path accommodation capability determining step determines that the connection of said quality guarantee request cannot be accommodated in said path already set or scheduled to be set.

* * * * *